United States Patent
Marshall et al.

(10) Patent No.: US 11,420,900 B2
(45) Date of Patent: Aug. 23, 2022

(54) LOCALIZED CONTROL OF BULK MATERIAL PROPERTIES

(71) Applicant: Apple Inc., Cupertino, CA (US)

(72) Inventors: Tyler A. Marshall, Sunnyvale, CA (US); Christopher D. Jones, Los Altos, CA (US)

(73) Assignee: APPLE INC., Cupertino, CA (US)

( * ) Notice: Subject to any disclaimer, the term of this patent is extended or adjusted under 35 U.S.C. 154(b) by 720 days.

(21) Appl. No.: 16/396,208

(22) Filed: Apr. 26, 2019

(65) Prior Publication Data

US 2020/0095159 A1     Mar. 26, 2020

Related U.S. Application Data

(60) Provisional application No. 62/736,949, filed on Sep. 26, 2018.

(51) Int. Cl.
    *C03C 10/00*        (2006.01)
    *G02F 1/055*        (2006.01)

(52) U.S. Cl.
    CPC ........ *C03C 10/0009* (2013.01); *G02F 1/0556* (2013.01)

(58) Field of Classification Search
    CPC .................................................. C03C 10/0009
    USPC ....................................................... 428/410
    See application file for complete search history.

(56) References Cited

U.S. PATENT DOCUMENTS

| | | | |
|---|---|---|---|
| 2,795,084 A | 6/1957 | Littleton | |
| 3,410,673 A | 11/1968 | Marusak | |
| 3,433,611 A | 3/1969 | Kubican | |
| 3,464,880 A | 9/1969 | Rinehart | |
| 3,737,294 A | 6/1973 | Dumbaugh, Jr. et al. | |
| 3,746,526 A | 7/1973 | Giffon | |
| 3,899,315 A | 8/1975 | Siegmund | |
| 4,054,895 A | 10/1977 | Ham et al. | |
| 4,070,211 A | 1/1978 | Haran et al. | |
| 4,209,229 A | 6/1980 | Rittler | |
| 4,339,300 A | 7/1982 | Noble et al. | |
| 4,735,917 A | 4/1988 | Flatley et al. | |

(Continued)

FOREIGN PATENT DOCUMENTS

| | | |
|---|---|---|
| CN | 103986803 | 8/2013 |
| CN | 104837781 | 8/2015 |

(Continued)

OTHER PUBLICATIONS

U.S. Appl. No. 17/553,105, filed Dec. 16, 2021, pending.

(Continued)

*Primary Examiner* — Christopher M Raabe
(74) *Attorney, Agent, or Firm* — Brownstein Hyatt Farber Schreck, LLP

(57) ABSTRACT

Electronic device components that include a glass portion and a ceramic or a glass ceramic portion are disclosed. The ceramic or glass ceramic portions of the component may be located to provide desired performance characteristics to the component, which may be an enclosure component. In addition, regions of compressive stress may be formed within the glass portion, the glass ceramic portion, or both to further adjust the performance characteristics of the component. Electronic devices including the components and methods for making the components are also provided.

20 Claims, 26 Drawing Sheets

(56) References Cited

U.S. PATENT DOCUMENTS

| | | |
|---|---|---|
| 4,849,299 A | 7/1989 | Loth et al. |
| 5,122,177 A | 6/1992 | Yoshizama et al. |
| 5,173,453 A | 12/1992 | Beall et al. |
| 5,273,553 A | 12/1993 | Hoshi et al. |
| 6,055,053 A | 4/2000 | Lesniak |
| 6,067,005 A | 5/2000 | DeVolpi |
| 6,169,256 B1 | 1/2001 | Hanahara |
| 6,406,769 B1 | 6/2002 | Delabre et al. |
| 6,809,278 B2 | 10/2004 | Tsubaki |
| 6,928,224 B2 | 8/2005 | Beall et al. |
| 7,115,827 B2 | 10/2006 | Tseng |
| 7,240,519 B2 | 7/2007 | Schwartz et al. |
| 7,459,199 B2 | 12/2008 | Skeen |
| 7,497,093 B2 | 3/2009 | Rosenflanz |
| 7,507,918 B2 | 3/2009 | Kazama |
| 7,799,158 B2 | 9/2010 | Yokoyama et al. |
| 7,902,474 B2 | 3/2011 | Mittleman |
| 7,915,556 B2 | 3/2011 | Ou |
| 7,966,785 B2 | 6/2011 | Zadesky et al. |
| 8,003,217 B2 | 8/2011 | Rosenflanz |
| 8,050,019 B2 | 11/2011 | Wennemer |
| 8,092,737 B2 | 1/2012 | Chang et al. |
| 8,212,455 B2 | 7/2012 | Yura et al. |
| 8,277,704 B2 | 10/2012 | Matsushima et al. |
| 8,379,159 B2 | 2/2013 | Hsu |
| 8,431,849 B2 | 4/2013 | Chen |
| 8,446,264 B2 | 5/2013 | Tanase |
| 8,665,160 B2 | 3/2014 | Uttermann et al. |
| 8,717,513 B2 | 5/2014 | Park et al. |
| 8,783,065 B2 | 7/2014 | Schillert et al. |
| 8,840,997 B2 | 9/2014 | Koyama et al. |
| 8,898,824 B2 | 12/2014 | Neidich et al. |
| 9,001,503 B1 | 4/2015 | Hibino |
| 9,030,440 B2 | 5/2015 | Pope |
| 9,069,198 B2 | 6/2015 | Kim et al. |
| 9,125,298 B2 | 9/2015 | Russell-Clarke |
| 9,134,547 B2 | 9/2015 | McCabe et al. |
| 9,140,522 B1 | 9/2015 | Miller et al. |
| 9,154,678 B2 | 10/2015 | Kwong et al. |
| 9,193,625 B2 | 11/2015 | Bookbinder et al. |
| 9,232,672 B2 | 1/2016 | Kwong |
| 9,242,889 B2 | 1/2016 | Yamakaji et al. |
| 9,249,045 B2 | 2/2016 | Gabel et al. |
| 9,263,209 B2 | 2/2016 | Chen |
| 9,302,937 B2 | 4/2016 | Gulati et al. |
| 9,321,677 B2 | 4/2016 | Chang et al. |
| 9,359,251 B2 | 6/2016 | Bookbinder et al. |
| 9,375,900 B2 | 6/2016 | Tsuchiya et al. |
| 9,390,930 B2 | 7/2016 | Rogers et al. |
| 9,392,706 B2 | 7/2016 | Yoo et al. |
| 9,429,997 B2 | 8/2016 | Myers et al. |
| 9,474,174 B2 | 10/2016 | Motohashi |
| 9,516,149 B2 | 12/2016 | Wright et al. |
| 9,522,836 B2 | 12/2016 | Gulati et al. |
| 9,524,413 B2 | 12/2016 | Kim |
| 9,632,537 B2 | 4/2017 | Memering et al. |
| 9,674,322 B2 | 6/2017 | Motohashi et al. |
| 9,678,540 B2 | 6/2017 | Memering et al. |
| 9,697,409 B2 | 7/2017 | Myers |
| 9,718,727 B2 | 8/2017 | Bookbinder et al. |
| 9,728,349 B2 | 8/2017 | Huang |
| 9,840,435 B2 | 12/2017 | Ohara et al. |
| 9,870,880 B2 | 1/2018 | Zercoe |
| 9,890,074 B2 | 2/2018 | Liu |
| 9,897,574 B2 | 2/2018 | Roussev et al. |
| 9,902,138 B2 | 2/2018 | Edwards |
| 9,902,641 B2 | 2/2018 | Hall et al. |
| 9,941,074 B2 | 4/2018 | Tu |
| 9,946,302 B2 | 4/2018 | Franklin et al. |
| 10,133,156 B2 | 11/2018 | Pilliod et al. |
| 10,141,133 B2 | 11/2018 | Bae |
| 10,146,982 B2 | 12/2018 | Hsu |
| 10,189,228 B2 | 1/2019 | Couillard et al. |
| 10,206,298 B2 | 2/2019 | Memering et al. |
| 10,286,631 B2 | 5/2019 | Alder et al. |
| 10,318,783 B2 | 6/2019 | Kang |
| 10,324,496 B2 | 6/2019 | Kwong et al. |
| 10,357,945 B2 | 7/2019 | Beall et al. |
| 10,494,860 B1 | 12/2019 | Jones et al. |
| 10,694,010 B2 | 6/2020 | Jones et al. |
| 10,702,211 B2 | 7/2020 | Clavelle et al. |
| 10,800,141 B2 | 10/2020 | Bartlow et al. |
| 10,827,635 B1 | 11/2020 | Limarga et al. |
| 10,875,277 B2 | 12/2020 | Aoki et al. |
| 10,917,505 B2 | 2/2021 | Jones et al. |
| 10,919,270 B2 | 2/2021 | Oh et al. |
| 11,192,823 B2 | 12/2021 | Li et al. |
| 11,199,929 B2 | 12/2021 | Poole et al. |
| 2003/0040346 A1 | 2/2003 | Fukuda et al. |
| 2003/0062490 A1 | 4/2003 | Fujieda |
| 2004/0003627 A1 | 1/2004 | Hashima |
| 2004/0041504 A1 | 3/2004 | Ozolins |
| 2004/0105026 A1 | 6/2004 | Campbell et al. |
| 2005/0135724 A1 | 6/2005 | Helvajian |
| 2005/0176506 A1 | 8/2005 | Goto |
| 2008/0049980 A1 | 2/2008 | Castaneda |
| 2009/0040737 A1 | 2/2009 | Shimura |
| 2010/0013786 A1 | 1/2010 | Nishikawa et al. |
| 2010/0108486 A1 | 5/2010 | Yoshida |
| 2010/0127420 A1 | 5/2010 | Dannoux |
| 2010/0148996 A1 | 6/2010 | Wang |
| 2010/0263708 A1 | 10/2010 | Reichart et al. |
| 2010/0279068 A1 | 11/2010 | Cook et al. |
| 2010/0285310 A1 | 11/2010 | Izutani et al. |
| 2010/0330814 A1 | 12/2010 | Yokota |
| 2011/0038115 A1 | 2/2011 | Halkosaari |
| 2011/0041987 A1 | 2/2011 | Hori et al. |
| 2011/0177300 A1 | 7/2011 | Hankey et al. |
| 2011/0253520 A1 | 10/2011 | Lim |
| 2012/0052271 A1 | 3/2012 | Gomez et al. |
| 2012/0176760 A1 | 7/2012 | Cohen et al. |
| 2012/0206669 A1 | 8/2012 | Kim |
| 2012/0236526 A1 | 9/2012 | Weber |
| 2012/0250273 A1 | 10/2012 | Kuo |
| 2012/0327325 A1 | 12/2012 | Park et al. |
| 2013/0128434 A1 | 5/2013 | Yamamoto et al. |
| 2013/0236699 A1 | 9/2013 | Prest et al. |
| 2014/0116090 A1 | 5/2014 | Lee et al. |
| 2014/0151320 A1 | 6/2014 | Chang et al. |
| 2014/0272298 A1 | 9/2014 | Memering et al. |
| 2014/0285956 A1 | 9/2014 | Russell-Clarke et al. |
| 2014/0311882 A1 | 10/2014 | Terashita |
| 2015/0002993 A1 | 1/2015 | Lee |
| 2015/0030834 A1 | 1/2015 | Morey et al. |
| 2015/0030859 A1 | 1/2015 | Rogers et al. |
| 2015/0044445 A1 | 2/2015 | Garner et al. |
| 2015/0077830 A1 | 3/2015 | Lin et al. |
| 2015/0093581 A1 | 4/2015 | Murata et al. |
| 2015/0104618 A1 | 4/2015 | Hayashi et al. |
| 2015/0122406 A1 | 5/2015 | Fisher et al. |
| 2015/0163382 A1 | 6/2015 | Kwong et al. |
| 2015/0165548 A1 | 6/2015 | Marjanovic et al. |
| 2015/0202854 A1 | 7/2015 | Tsuchiya et al. |
| 2015/0212247 A1 | 7/2015 | Borrelli et al. |
| 2015/0232366 A1 | 8/2015 | Fredholm et al. |
| 2015/0241732 A1 | 8/2015 | Kim et al. |
| 2015/0245514 A1 | 8/2015 | Choung |
| 2015/0274572 A1 | 10/2015 | Wada et al. |
| 2015/0299036 A1 | 10/2015 | Ukrainczyk et al. |
| 2016/0028931 A1 | 1/2016 | Kwong et al. |
| 2016/0083282 A1 | 3/2016 | Jouanno et al. |
| 2016/0137550 A1 | 5/2016 | Murata et al. |
| 2016/0224142 A1 | 8/2016 | Yang et al. |
| 2016/0270247 A1 | 9/2016 | Jones et al. |
| 2016/0357294 A1 | 12/2016 | Czeki et al. |
| 2016/0377768 A1 | 12/2016 | Wilson et al. |
| 2017/0059749 A1 | 3/2017 | Wakatsuki et al. |
| 2017/0066223 A1 | 3/2017 | Notsu et al. |
| 2017/0282503 A1 | 10/2017 | Peng et al. |
| 2017/0300114 A1 | 10/2017 | Matsuyuki et al. |
| 2017/0305788 A1 | 10/2017 | Nikulin |
| 2017/0334770 A1 | 11/2017 | Luzzato et al. |
| 2017/0340518 A1 | 11/2017 | Logunov et al. |
| 2017/0355633 A1 | 12/2017 | Cook et al. |

(56) References Cited

U.S. PATENT DOCUMENTS

| | | | |
|---|---|---|---|
| 2017/0364172 | A1 | 12/2017 | Kim et al. |
| 2017/0372112 | A1* | 12/2017 | Baker .................. G06V 40/1329 |
| 2018/0009697 | A1 | 1/2018 | He et al. |
| 2018/0024274 | A1 | 1/2018 | Rogers et al. |
| 2018/0086026 | A1 | 3/2018 | Nguyen et al. |
| 2018/0086663 | A1 | 3/2018 | Luzzato et al. |
| 2018/0088399 | A1 | 3/2018 | Fukushi et al. |
| 2018/0125756 | A1 | 5/2018 | Gerrish et al. |
| 2018/0126704 | A1 | 5/2018 | Zhang et al. |
| 2018/0134606 | A1 | 5/2018 | Wagner et al. |
| 2018/0154615 | A1 | 6/2018 | Dohn et al. |
| 2018/0237325 | A1 | 8/2018 | Li et al. |
| 2018/0282207 | A1 | 10/2018 | Fujii et al. |
| 2018/0304588 | A1 | 10/2018 | Harris et al. |
| 2018/0304825 | A1 | 10/2018 | Mattelet et al. |
| 2018/0326704 | A1 | 11/2018 | Harris et al. |
| 2018/0370843 | A1 | 12/2018 | Gross et al. |
| 2019/0022979 | A1 | 1/2019 | Luzzato et al. |
| 2019/0030861 | A1 | 1/2019 | Bellman et al. |
| 2019/0033144 | A1 | 1/2019 | Andrews et al. |
| 2019/0037690 | A1 | 1/2019 | Wilson et al. |
| 2019/0134944 | A1 | 5/2019 | Dawson-Elli |
| 2019/0160787 | A1 | 5/2019 | Bartlow et al. |
| 2019/0161402 | A1 | 5/2019 | Harris et al. |
| 2019/0169061 | A1 | 6/2019 | Jones et al. |
| 2019/0177215 | A1 | 6/2019 | Jin et al. |
| 2019/0219463 | A1 | 7/2019 | Orihara et al. |
| 2019/0263708 | A1 | 8/2019 | Bookbinder et al. |
| 2019/0293838 | A1 | 9/2019 | Haba et al. |
| 2020/0014780 | A1 | 1/2020 | Jones et al. |
| 2020/0017406 | A1* | 1/2020 | Wilson .................. G06F 1/1605 |
| 2020/0039186 | A1 | 2/2020 | Yuan et al. |
| 2020/0055281 | A1 | 2/2020 | Yoon et al. |
| 2020/0095159 | A1 | 3/2020 | Marshall et al. |
| 2020/0301527 | A1 | 9/2020 | Poole et al. |
| 2020/0339472 | A1 | 10/2020 | Yoon et al. |
| 2020/0346525 | A1 | 11/2020 | Mannheim Astete et al. |
| 2020/0369560 | A1* | 11/2020 | Takeda .................. C03C 3/085 |
| 2020/0407266 | A1 | 12/2020 | Suzuki et al. |
| 2021/0009469 | A1 | 1/2021 | Marshall et al. |
| 2021/0014992 | A1 | 1/2021 | Limarga et al. |
| 2021/0016547 | A1 | 1/2021 | Bartlow et al. |
| 2021/0033757 | A1 | 2/2021 | Wilson et al. |
| 2021/0072789 | A1 | 3/2021 | Rogers et al. |
| 2021/0303031 | A1 | 9/2021 | Poole et al. |
| 2021/0361233 | A1 | 11/2021 | Wilson et al. |
| 2022/0117094 | A1 | 4/2022 | Prest et al. |

FOREIGN PATENT DOCUMENTS

| | | |
|---|---|---|
| CN | 106007345 | 10/2016 |
| CN | 106341962 | 1/2017 |
| CN | 106485275 | 3/2017 |
| CN | 018285263 | 7/2018 |
| CN | 108285263 | 7/2018 |
| CN | 108545917 | 9/2018 |
| CN | 108632510 | 10/2018 |
| CN | 215010334 | 12/2021 |
| DE | 102016107630 | 10/2017 |
| JP | S6042176 | 9/1985 |
| JP | S6271215 | 5/1987 |
| WO | WO2010/077845 | 7/2010 |
| WO | WO2012/027660 | 3/2012 |
| WO | WO2012/074983 | 6/2012 |
| WO | WO2014/022356 | 2/2014 |
| WO | WO2014/022681 | 2/2014 |
| WO | WO2015/031420 | 3/2015 |
| WO | WO2015/095089 | 6/2015 |
| WO | WO2016/065118 | 4/2016 |
| WO | WO2017/196800 | 11/2017 |
| WO | WO2019/199791 | 10/2019 |

OTHER PUBLICATIONS

U.S. Appl. No. 17/553,228, filed Dec. 16, 2021, pending.

U.S. Appl. No. 17/559,129, filed Dec. 22, 2021, pending.

Dudutis et al., Bessel beam asymmetry control for glass dicing applications, Procedia CIRP 74, pp. 333-338, 2018.

Gottmann et al., "Microcutting and Hollow 3D Microstructures in Glasses by In-Volume Selective Laser-induced Etching," Journal of Laser Micro / Nanoengineering, vol. 8, No. 1, pp. 15-18, Jan. 2013.

Jenne et al., "High-quality Tailored-edge Cleaving Using Aberration-corrected Bessel-like Beams," arXiv:2010.10226v1 [physics.optics], May 8, 2018.

Moriceau et al., "Overview of recent direct wafer bonding advances and applications," Advances in Natural Sciences: Nanoscience and Nanotechnology, vol. 1, No. 043004, 11 pages, 2010.

Aben et al., "A New Method for Tempering Stress Measurement in Glass Panels," Estonian Journal of Engineering, vol. 19, No. 4, pp. 292-297, 2013.

Bourhis, "Production Control of Residual Stresses," Glass Mechanics and Technology, Second Edition, pp. 236-243, 2014.

Mao et al., "Fabrication and characterization of 20 nm planar nanofluidic channels by glass-glass and glass-silicon bonding," www.rsc.org/loc, 8 pages, Jun. 30, 2005.

Decourcelle, et al., "Controlling Anisotropy," Conference Proceedings, All Eyes on Glass, Glass Performance Days, Tampere, Finland, Jun. 28-30, 2017.

Ungaro et al., "Using phase-corrected Bessel beams to cut glass substrates with a chamfered edge," Applied Optics, vol. 60, No. 3, p. 714, Dec. 10, 2020.

* cited by examiner

LOCALIZED CONTROL OF BULK MATERIAL PROPERTIES

CROSS-REFERENCE TO RELATED APPLICATION(S)

This application is a non-provisional patent application of and claims the benefit of U.S. Provisional Patent Application No. U.S. Provisional Patent Application No. 62/736,949 filed Sep. 26, 2018 and titled "Localized Control of Bulk Material Properties," the disclosure of which is hereby incorporated by reference in its entirety.

FIELD

The described embodiments relate generally to components for electronic devices which have different properties at different locations. More particularly, the present embodiments relate to components including glass portions and ceramic or glass ceramic portions positioned to provide different materials properties at different locations.

BACKGROUND

Traditional electronic devices include parts formed of glass or ceramic materials, such as cover sheets and the like. However, the materials properties of a glass or a ceramic part may limit the performance of the part in the electronic device. For example, the performance of a part formed of a ceramic may be limited if the ceramic has a relatively low fracture toughness.

Embodiments described herein are directed to electronic device components that may have advantages as compared to some traditional glass or ceramic components. The techniques described herein are generally directed to including one or more glass portions and one or more ceramic or glass ceramic portions in the component. The glass portions and the ceramic or glass ceramic portions may be positioned to improve the component's resistance to cracking and/or bending stresses.

SUMMARY

Embodiments described herein are directed to electronic device components that include a glass portion and a ceramic or a glass ceramic portion. The electronic device components may be components of the enclosure of the electronic device. Localized control of the bulk materials properties within the component can provide desired performance characteristics to the component. For example, the ceramic or glass ceramic portions of the component may be located to provide good impact resistance. In additional examples, regions of compressive stress may be formed within the glass and/or the glass ceramic portions to further adjust the performance characteristics of the component.

In aspects of the disclosure, an enclosure component for an electronic device comprises a glass portion and a ceramic or glass ceramic portion. The ceramic or glass ceramic portion may be formed along an exterior surface of the enclosure component. The glass portion may extend along an interior surface of the enclosure component. In some embodiments, the thickness of the glass portion is greater than that of the ceramic or glass ceramic portion. By the way of example, the thickness of the ceramic or glass ceramic portion may be from about 20% to about 40% of the thickness of the part. The enclosure components may be monolithic components or laminate components. Further, the enclosure components may be transparent, translucent, or opaque.

Enclosure components of the present disclosure can provide performance improvements over traditional glass or ceramic enclosure components. When the ceramic or glass ceramic has a higher hardness than the glass, the scratch and/or impact resistance at the exterior surface may be increased as compared to that of an enclosure component wholly formed of the glass, including a glass portion in the enclosure component may also provide several advantages. For example, a glass portion may give an increased transparency or reduced haze as compared to an enclosure component formed wholly of the ceramic or the glass ceramic. Further, a softer glass portion may be easier to machine to a desired shape and surface finish than a harder ceramic or the glass ceramic. Further, when the glass has a lower modulus than the ceramic or the glass ceramic, stresses due to bending of the enclosure component may be reduced in the glass as compared to the ceramic or the glass ceramic. In addition, an ion-exchangeable glass portion can be ion exchanged to form a region of residual compressive stress, unlike some ceramics which are not readily ion-exchangeable.

The enclosure component may include a region of residual compressive stress (i.e., compressive stress region) in the glass portion, within the ceramic or glass ceramic portion, or both. A compressive stress region along the exterior surface of the enclosure component, within the ceramic or glass ceramic portion, can improve the resistance of the enclosure component to cracking. In addition, including a region of residual compressive stress along the interior surface can at least partially reduce an asymmetry of stress across a thickness of the part. In additional embodiments, a region of the glass ceramic portion may be under a neutral stress.

The enclosure component may further include a first compressive stress region located at least partially within the ceramic or the glass ceramic portion and extending a first depth into the enclosure component. The enclosure component may also include a second compressive stress region located within the glass portion and extending a second depth into the enclosure component and a tensile stress region between the first compressive stress region and the second compressive stress region.

In some embodiments, a cover for an electronic device comprises a central zone defining a window for viewing a display of the electronic device and a glass ceramic portion along an exterior surface of the central zone, comprising an at least partially crystallized glass ceramic, and including a first compressive stress region extending a first depth into the cover. The cover further comprises a glass portion along an interior surface of the central zone, comprising a glass, and including a second compressive stress region extending a second depth into the cover. In addition, the cover comprises a tensile stress region between the first compressive stress region and the second compressive stress region.

In additional aspects of the disclosure, a thicker ceramic or glass ceramic portion may be provided in a peripheral zone of the enclosure component in order to provide greater protection to sides and edges of the enclosure component. The enclosure component may include a first glass ceramic portion in the central zone and a thicker second glass ceramic portion in the peripheral zone. The peripheral zone may at least partially surround the central zone.

In some embodiments, an electronic device comprises a display, an enclosure component at least partially surrounding the display, and a cover positioned over the display. The cover comprises a central zone at least partially overlapping the display and a peripheral zone contiguous with and at least partially surrounding the central zone. The central zone comprises a first partially crystallized glass ceramic portion formed along an exterior surface of the cover and extending into the cover to a first thickness and a glass portion extending along an interior surface of the cover and including a compressive stress region. The peripheral zone comprises a second partially crystallized glass ceramic portion formed along the exterior surface of the cover and extending into the cover to a second thickness greater than the first thickness.

In additional aspects of the disclosure, the enclosure component comprises a laminate of a glass layer and a ceramic or a glass ceramic layer. The ceramic or glass ceramic layer defines an exterior surface of the enclosure component while the glass layer defines an interior surface of the enclosure component.

In some embodiments, a cover for an electronic device comprises a first layer defining at least a portion of an exterior surface of the cover and comprising a crystalline ceramic. The cover further comprises a second layer bonded to the first layer, comprising a glass, and having a compressive stress region.

By the way of example, the crystalline ceramic comprises sapphire. As another example, the crystalline ceramic comprises an at least partially crystallized glass ceramic. From an additional perspective, the first layer comprises an at least partially crystallized glass ceramic including a crystalline ceramic phase. In additional embodiments, a chemical composition of the at least partially crystallized glass ceramic is different than a chemical composition of the glass.

In addition, the disclosure provides methods for making the enclosure components described herein. In embodiments, the methods include an operation of forming a glass ceramic in a surface region of a glass component. By the way of example, the operation of forming the glass ceramic comprises at least partially crystallizing a surface region of the glass component. Selective crystallization of the surface region of a glass component can create a glass ceramic portion having different material properties than a remainder glass portion of the component. For example, if the crystals have a lower coefficient of thermal expansion than the glass from which they are formed, the glass ceramic portion of the component tends to contract less than the glass portion when cooled from a crystallization temperature. As a result, compressive stresses can be introduced into the glass ceramic portion.

For example, a method for making an enclosure component for an electronic device comprises heating the enclosure component comprising a crystallizable glass to a nucleation temperature of the crystallizable glass. The method further comprises heating an exterior surface of the enclosure component to a crystallization temperature of the crystallizable glass while cooling an interior surface of the enclosure component below the crystallization temperature, thereby forming an at least partially crystallized glass ceramic along the exterior surface.

The methods may include an operation of bonding a ceramic or glass ceramic layer to a glass layer. The ceramic or glass ceramic layer may be bonded to the glass layer at a temperature below a softening temperature or an annealing temperature of the glass. For example, a diffusion bonding process may be used to bond the ceramic or glass ceramic layer to the glass layer.

The methods may further include one or more ion exchange operations. In some embodiments, a glass portion of the component may be ion exchanged to form a compressive stress region along an interior surface of the component. For example, alkali metal ions in the glass portion of the component may be exchanged for larger alkali metal ions at a temperature below the strain point of the glass. In additional embodiments, a glass ceramic portion may be ion exchanged to form a compressive stress region along an exterior surface of the component. For example, alkali metal ions in the crystals or in the residual glass of the glass ceramic portion may be exchanged for larger alkali metal ions.

BRIEF DESCRIPTION OF THE DRAWINGS

The disclosure will be readily understood by the following detailed description in conjunction with the accompanying drawings, wherein like reference numerals designate like elements.

Figure 1A:
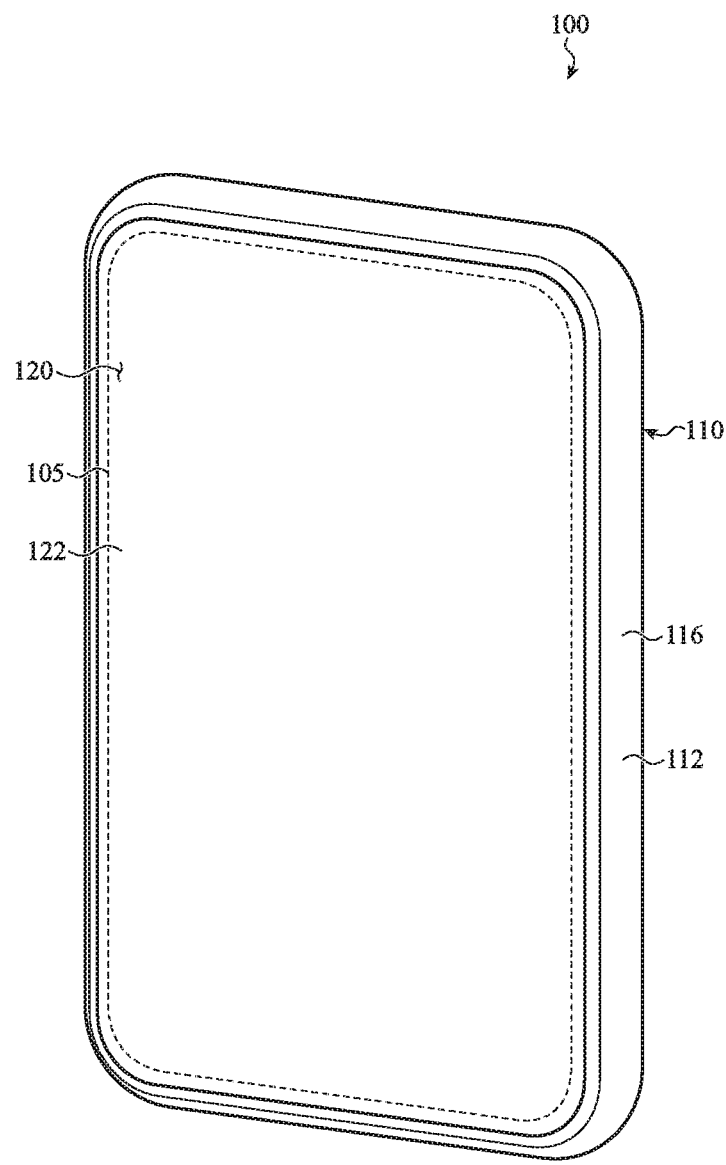
FIG. 1A depicts a front view of a simplified example of an electronic device.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred implementation. To the contrary, the described embodiments are intended to cover alternatives, modifications, and equivalents as can be included within the spirit and scope of the disclosure and as defined by the appended claims.

The current description is generally directed to components for an electronic device. The techniques and examples described herein may be used to create components for the cover glass of an electronic device, other enclosure components, and other glass-based articles that may form at least a portion of an external surface of the electronic device.

In embodiments, the current description is directed to a cover or other enclosure component that includes an at least partially crystallized glass ceramic along an exterior surface or exterior portion of the cover or other enclosure component to improve impact performance of the enclosure component without increasing its susceptibility to overstressing failures. In some cases, the cover or other enclosure component includes a glass ceramic portion formed along an exterior surface and a glass portion along an interior surface of the enclosure component. For example, an at least partially crystallized glass ceramic of the glass ceramic portion may have a higher modulus than a glass of the glass portion. Therefore, the modulus of the glass ceramic portion can be increased while maintaining the modulus of other regions of the enclosure component. As additional examples, the at least partially crystallized glass ceramic may have a higher hardness and a higher fracture toughness than the glass, both of which may enhance impact resistance of the enclosure component.

As described herein, the enclosure component may include a compressive stress region along the interior surface, the exterior surface, or both the interior and the exterior surface of the enclosure component. A compressive stress region at the exterior surface of the enclosure component, within the ceramic or glass ceramic portion, can improve the resistance of the enclosure component to cracking.

Methods for making the enclosure components are also disclosed herein. The enclosure components may be made in any number of different ways. In some example embodiments, the methods include an operation of forming a glass ceramic in a glass enclosure component. In additional example embodiments, the methods include an operation of bonding a ceramic or glass ceramic layer to a glass layer.

These and other embodiments are discussed below with reference to FIGS. 1A-20. However, those skilled in the art will readily appreciate that the detailed description given herein with respect to these figures is for explanatory purposes only and should not be construed as limiting.

FIG. 1A depicts a front view of a simplified example of an electronic device. As shown in FIG. 1A, the electronic device 100 includes an enclosure 110 including a cover 120 and an enclosure component 112. The cover 120 may define at least a portion of an exterior surface 122. In embodiments, the cover 120 includes a glass portion and a ceramic or a glass ceramic portion, as described herein. However, the description provided is not limited to covers and the principles described herein are applicable to other components of the enclosure 110, including, for example, the enclosure component 112.

The cover 120 or other enclosure component may form part or all of the enclosure 110. The enclosure 110 may include both a front and a rear cover, with each being separate components. In some embodiments, the cover 120 or other enclosure component may be a single monolithic component (e.g., a unitary component) which defines at least a portion of each of the side and the front or the back of the electronic device. Further, a single monolithic component may define at least a portion of each of the front, the back, and the side of the electronic device. In some cases, the cover 120 or other enclosure component may define substantially the entire front surface of a device as well as a portion (or all) of a surrounding sidewall or side of the device. The cover 120 or other enclosure component may also define substantially the entire rear surface of the device as well as a portion (or all) of a surrounding sidewall or side of the device.

As shown in FIG. 1A, the cover 120 is positioned over a display 105 that is at least partially enclosed or surrounded by the enclosure component 112 of the enclosure 110. The display may produce high-resolution graphical output. The graphical output from the display 105 may be viewable through the cover 120. For example, the cover 120 may define a central zone that functions as a window or transparent region for viewing the display 105. The central zone may at least partially overlap the display 105.

The cover 120 may also be integrated with or coupled to a touch sensor that is configured to detect or estimate a location of a touch along the exterior surface of the cover 120. The touch sensor may include an array of capacitive electrodes that are positioned below the cover 120 and, in some instances, may be integrated with the display 105. The touch sensor in combination with the display 105 may define a touchscreen or touch-sensitive display. A more detailed description of the display 105 and touch sensor is included below with respect to FIG. 20.

The enclosure 110 may be formed from one or more different materials. In some embodiments, the enclosure 110 includes one or more glass components, metal or metallic components, a ceramic component, a glass ceramic component, a component comprising a glass portion and a ceramic or a glass ceramic portion, composite components, or a combination thereof.

In some embodiments, an enclosure component, such as the cover 120, may comprise or may be formed from a glass member, such as a sheet of glass (e.g., a flat glass sheet or a contoured or shaped glass sheet). In some cases, an enclosure component may comprise or may be formed from multiple layers that include one or more glass sheets, polymer sheets, glass ceramic sheets, ceramic sheets, and/or various coatings and layers. By the way of example, coatings may be organic (e.g., an organic polymer), inorganic (e.g., a metal or a ceramic), or combinations thereof.

In embodiments, covers and other enclosure components as described herein are thin, typically less than 5 mm in thickness, and more typically less than 3 mm in thickness. The cover or other enclosure component may be from about 0.1 mm to 2 mm in thickness, and more typically from 0.15 mm to 1 mm in thickness. Additionally, the cover or other enclosure component may be from about 0.1 mm to 2 mm in thickness or from 0.15 mm to 1 mm in thickness.

The enclosure component 112 of the enclosure 110 may define one or more side surfaces 116. The cover 120 may be coupled to the enclosure component 112 using an adhesive, one or more fasteners or other fastening technique or bonding agent. For example, the cover 120 may be coupled to the enclosure 110 using a pressure sensitive adhesive, liquid adhesive, an engagement feature, a fastener, or a combination of any of these.

Figure 1B:
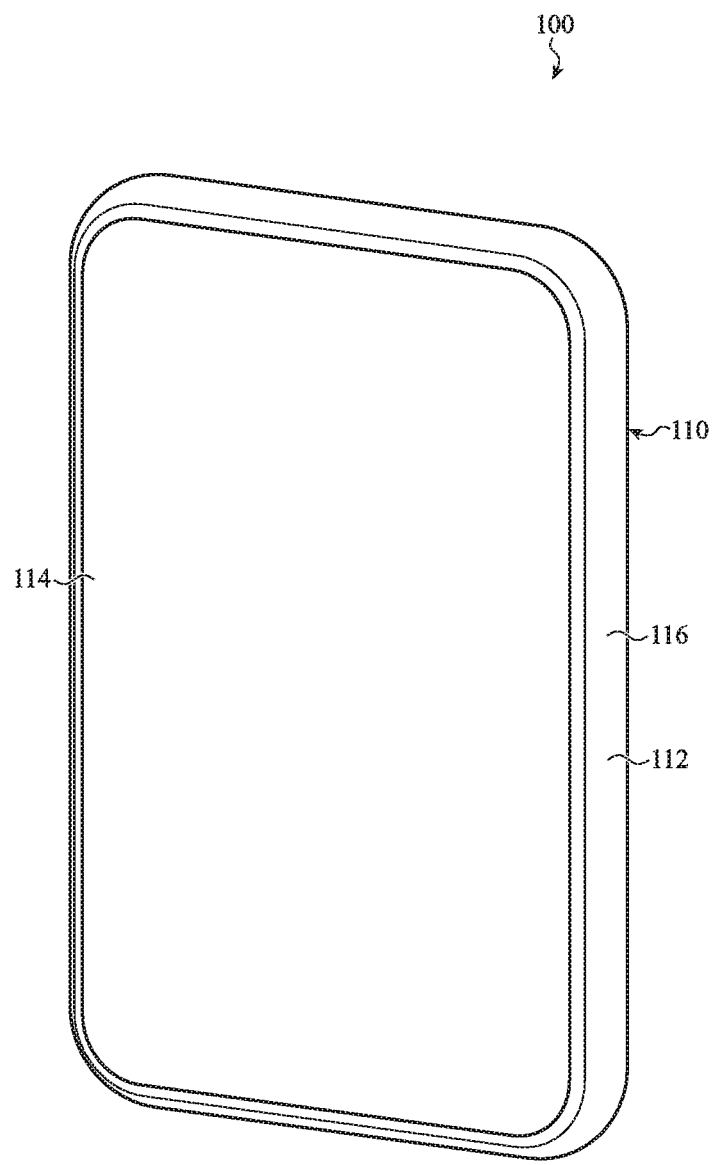
FIG. 1B depicts a back view of the electronic device of FIG. 1A.

FIG. 1B depicts a back view of the electronic device 100 of FIG. 1A. In this example, the enclosure 110 further defines a back surface 114 of the electronic device 100. The back surface 114 and the side surfaces 116 of the electronic device 100 may each be defined by a metal or metallic component, a glass component, a ceramic component, a glass ceramic component, a component comprising a glass portion and a ceramic or a glass ceramic portion, or a combination thereof. In some embodiments, the electronic device 100 may further include a second cover, which forms at least a portion of the back surface 114 of the electronic device 100. Alternately, the housing component 112 may define the back surface 114 of the electronic device 100.

In embodiments, the electronic device 100 may be a mobile telephone, a notebook computing device (e.g., a notebook), a tablet computing device (e.g., a tablet), a portable media player, a wearable device, or another type of portable device. The electronic device 100 may also be a desktop computer system, notebook computer system (e.g., laptop), computer component, input device, or virtually any other type of electronic product or device component.

Figure 2:
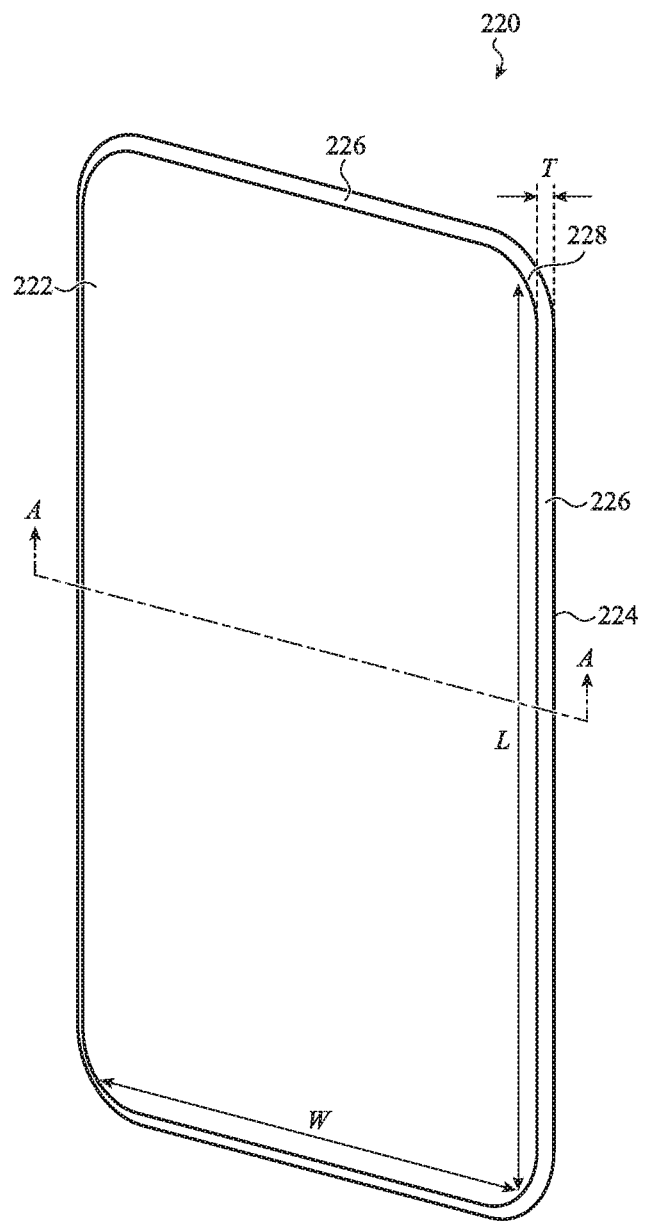
FIG. 2 depicts a simplified example of a cover for the electronic device of FIG. 1A.

FIG. 2 depicts an example cover 220 for an electronic device. As shown in FIG. 2, the cover 220 is generally rectangular and defines a length, L, a width, W, and a thickness, T. The thickness T of cover 220 may be from 0.3 mm to 3 mm, 0.1 mm to 2 mm, or from 25 μm to 1 mm. The cover 220 further includes edges 228 between the front surface 222 and the side surface 226 and between the back surface 224 and the side surface 226. Edges 228 are shown in FIG. 2 as rounded, but other edge shapes are within the scope of the disclosure.

Although cover 220 is shown as having a generally rectangular shape, portions of the following description, such as the composition and other properties of the cover, may apply to covers having other shapes. Portions of the following description may also apply to other forms of enclosure components, such as those previously described with respect to FIG. 1.

In embodiments, the various surfaces of cover 220 may be referenced with respect to their orientation in an electronic device. As shown in FIG. 2, cover 220 defines an exterior surface 222 (which faces an exterior of the electronic device). This surface may also form an exterior surface of the electronic device. Alternately, the exterior surface 222 may be referred to as an external or outer surface. The exterior surface 222 may form substantially an entire front surface of the device and define a front surface of the cover 220.

The cover 220 may have a surface 224 which faces an interior of the electronic device. This surface 224 may be referred to as an interior surface, internal surface, or an inner surface. The interior surface may form a back or rear surface of the glass article. The terms "interior," "exterior," "front", and "rear" are used to identify surfaces of the glass article relative to the electronic device; the orientation of the electronic device is not intended to be limited by the use of these terms.

As shown in FIG. 2, the cover 220 also includes side surfaces 226 extending between the exterior surface 222 and the interior surface 224. A periphery of the glass article may be defined at least in part by the side surfaces 226. In some cases, a rounded edge or curved portion of the cover 220 joint the side surfaces 226 to the exterior surface 222 and/or the interior surface 224.

As an example, the cover 220 may be at least partially transparent. For example, the cover 220 may have a transmittance in the visible spectrum of at least 50% or at least 75%. The cover 220 may define one or more transparent portions or windows to allow viewing of a display within the electronic device and/or function as a window for a camera or an optical sensor. As described herein, the cover 220 may include a central zone that defines a window for viewing a display or other visual component. In additional embodiments, the cover 220 may be translucent or opaque over a portion or all of the area of the component. The cover 220 may also include one or more regions that are covered with a decoration or an opaque coating.

In some embodiments, the cover 220 includes a glass ceramic portion and a glass portion. Examples of covers including a glass ceramic portion and a glass portion are provided at least by FIGS. 4A-4C and 5A-5B. The glass ceramic portion comprises a glass ceramic and the glass portion comprises a glass. As previously described, including a glass ceramic along an exterior surface of the cover can provide increased hardness, toughness, and/or crack resistance along the exterior surface of the cover. Including a glass along the interior surface of the cover can provide a lower modulus along the interior surface. The glass ceramic portion and the glass portion may be formed from a single monolithic piece of a crystallizable glass. For example, a region of the crystallizable glass may be least partially crystallized to form the glass ceramic portion. In some embodiments, the cover includes a glass ceramic portion along an exterior surface of the cover and a glass portion along the interior surface of the cover. The glass ceramic portion may define an exterior surface of the cover and the glass portion may define an interior surface of the cover.

The glass portion of the cover comprises a glass. In embodiments the glass is crystallizable to form a glass ceramic. In further embodiments, the glass is ion exchangeable. For example, the glass portion comprises an aluminosilicate glass or a boroaluminosilicate glass. As used herein, an aluminosilicate glass includes the elements aluminum, silicon, and oxygen, but may further include other elements. Similarly, a boroaluminosilicate glass includes the elements boron, aluminum, silicon, and oxygen, but may further include other elements. For example, an aluminosilicate glass or a boroaluminosilicate glass may further include monovalent or divalent ions which compensate charges due to replacement of silicon ions by aluminum ions. Suitable monovalent ions include, but are not limited to, alkali metal ions such as $Li^+$, $Na^+$, or $K^+$. Suitable divalent ions include alkaline earth ions such as $Ca^{2+}$ or Me.

The glass ceramic portion comprises a glass ceramic. As referred to herein, a glass ceramic comprises one or more crystalline phases. Therefore, the glass ceramic is at least partially crystallized. The glass ceramic may further comprise an amorphous phase. By the way of example, the glass ceramic may be an alkaline silicate, an alkaline earth silicate, or an aluminosilicate, or a boroaluminosilicate. In additional embodiments, the glass ceramic portion comprises an aluminosilicate glass ceramic or a boroaluminosilicate glass ceramic. As used herein, an aluminosilicate glass ceramic includes the elements aluminum, silicon, and oxygen, but may further include other elements. Similarly, a boroaluminosilicate glass ceramic includes the elements boron, aluminum, silicon, and oxygen, but may further include other elements. As previously described for aluminosilicate and boroaluminosilicate glasses, aluminosilicate and boroaluminosilicate glass ceramics may further include monovalent or divalent ions which compensate charges due to replacement of silicon ions by aluminum ions.

In embodiments, the glass ceramic portion comprises an at least partially crystallized glass ceramic including a crystalline phase and a first amorphous phase. Further, the glass portion comprises a glass including a second amorphous phase. As an example, the crystalline phase comprises from 20% to 90% of the at least partially crystallized glass ceramic or of the glass ceramic portion by volume. The second amorphous phase may comprise greater than 80% of the glass portion by volume.

In embodiments, the glass ceramic portion extends into the cover to a depth that is small enough that the clarity of the cover is not substantially decreased. In embodiments, any haze due to the glass ceramic portion is within acceptable limits. For example, a thickness of the glass ceramic portion may be from about 20% to about 40% of the thickness of the cover. As additional examples, a thickness of the glass ceramic portion may be from about 100 microns to about 400 microns.

As previously discussed, the glass ceramic may be formed by at least partially crystallizing a region of a crystallizable glass part. As an example, the glass from which the glass ceramic is formed may be an aluminosilicate glass and the glass ceramic may be an aluminosilicate glass ceramic. The glass portion therefore may comprise the aluminosilicate glass. In some embodiments, the glass from which the glass ceramic is formed is a lithium aluminosilicate glass. Lithium aluminosilicate glasses can form several types of crystals, including β quartz solid solution crystals, β spodumene solid solution crystals, and keatite solid solution crystals. The resulting crystals may have a coefficient of thermal expansion which is close to zero or even less than zero. Alternately, a layer comprising a glass ceramic may be bonded to a layer comprising a glass as described with respect to FIGS. 17A-17B.

In further embodiments, the cover 220 includes a ceramic portion. In aspects of the disclosure the ceramic portion comprises a metal oxide. Suitable metal oxides include, but are not limited to, aluminum oxide (e.g., alumina, sapphire, $Al_2O_3$) and zirconium oxide (e.g., zirconia, yttria-stabilized zirconia, $ZrO_2$). Further examples of these embodiments are described below with respect to FIGS. 16A-17B.

Figure 3:
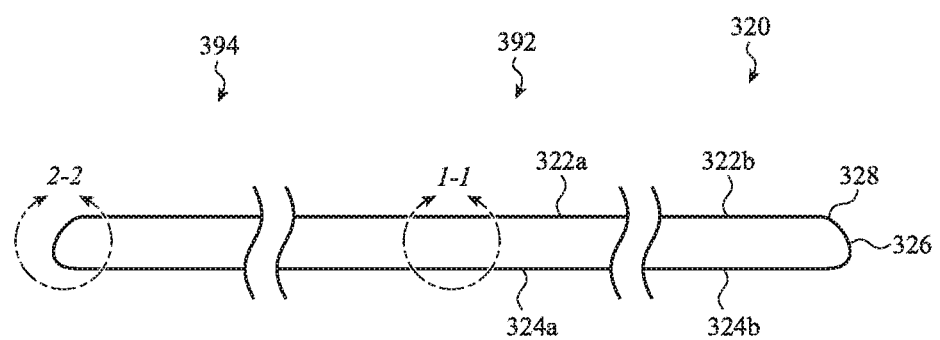
FIG. 3 shows a simplified cross-section view of an example cover.

FIG. 3 shows a simplified cross-section view of an example cover 320. Cover 320 may be an example of the cover 220 of FIG. 2, sectioned along A-A. Cover 320 includes central zone 392 and peripheral zone 394. In this example, the central zone 392 and the peripheral zone 394 are contiguous. Central zone 392 includes central exterior surface 322a and central interior surface 324a. Peripheral zone 394 includes peripheral exterior surface 322b, peripheral interior surface 324b, side surface 326, and edges 328. Inset 1-1 is located in the central zone and inset 2-2 is located in the peripheral zone.

Figure 4A:
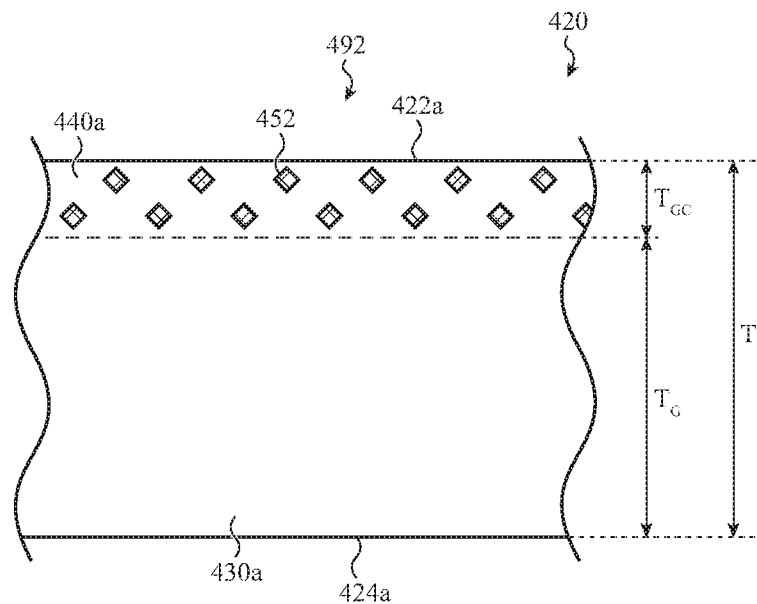
FIGS. 4A, 4B, and 4C illustrate glass and glass ceramic portions in example covers.
Figure 4B:
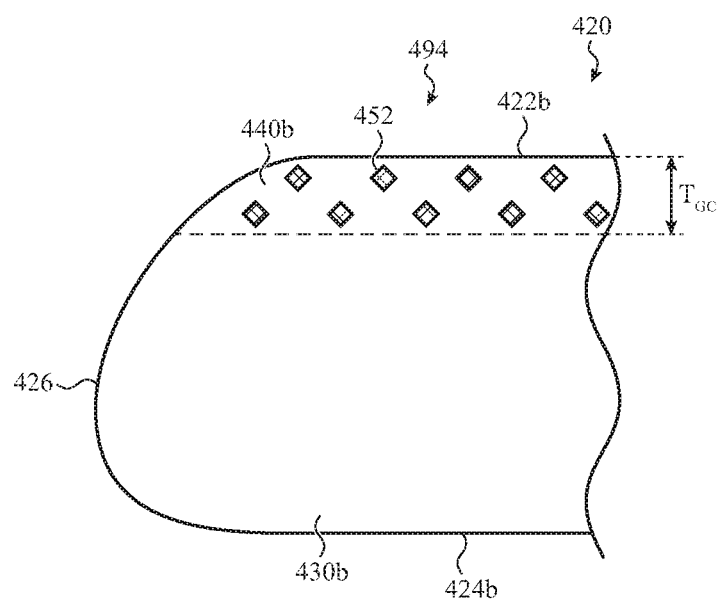
Figure 4C:
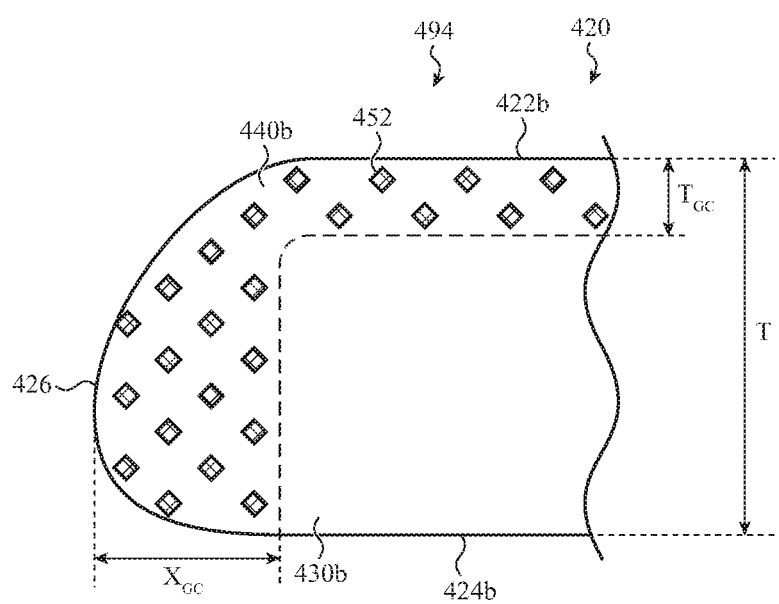

FIGS. 4A, 4B, and 4C illustrate examples of covers 420 including a glass ceramic region at an exterior surface of the cover and a glass region at an interior surface of the cover. Such covers may have increased impact resistance along the exterior surface without increasing susceptibility to over stressing failures.

FIG. 4A shows a detailed view of the inset 1-1 of FIG. 3 for an example cover including a glass portion 430a and a glass ceramic portion 440a in central zone 492. As discussed with respect to FIG. 2, the glass ceramic portion may comprise a glass ceramic including one or more crystalline phases and a first amorphous phase and the glass may comprise a second amorphous phase. Crystals 452 in FIG. 4A schematically represent the crystalline phase of the glass ceramic; the crystals 452 are not necessarily shown to scale. The compositions, phase amounts, and thicknesses of the glass ceramic portion and the glass portion may be as described for FIG. 2.

The central zone 492 further includes central exterior surface 422a and central interior surface 424a. The glass ceramic portion 440a defines central exterior surface 422a and the glass portion 430a defines central interior surface 424a. As shown, each of central exterior surface 422a and central interior surface 424a are generally planar and opposite one another but this is not required. The thickness T of the component, the thickness $T_{GC}$ of the glass ceramic portion, and the thickness $T_G$ of the glass portion in the central portion are also illustrated. As shown, the thickness of the glass ceramic portion is less than the thickness of the glass portion.

FIG. 4B shows a detailed view of the inset 2-2 of FIG. 3 for an example cover including a glass portion 430b and a glass ceramic portion 440b in peripheral zone 494. As shown, the glass ceramic portion 440b does not extend along the entire side surface 426.

As shown in FIG. 4B, the peripheral zone 494 further includes peripheral exterior surface 422b, peripheral interior surface 424b, and side surface 426. The glass ceramic portion 440b defines peripheral exterior surface 422b and a part of side surface 426. Glass portion 430b defines peripheral interior surface 424b and another part of side surface 426. Crystals 452 in FIG. 4B schematically represent the crystalline phase of the glass ceramic; the crystals 452 are not necessarily shown to scale. The compositions, phase amounts, and thicknesses of the glass ceramic portion and the glass portion may be as described for FIG. 2.

As shown in FIG. 4B, side surface 426 has a curved shape. Due to the curved shape of side surface 426, the thickness of the glass ceramic portion 440b decreases as it approaches side surface 426 (as measured from the plane defined by peripheral exterior surface 422b). In additional embodiments, side surface 426 includes a curved region and a generally planar region.

FIG. 4C shows a detailed view of the peripheral zone of another example peripheral zone of a cover. As shown, peripheral zone 494 includes a glass portion 430b and a glass ceramic portion 440b. The glass ceramic portion 440b in the peripheral zone 494 extends along the entire side surface 426. The glass ceramic portion 440b has a thickness $T_{GC}$ along the peripheral exterior surface 422b, a thickness substantially equal to a thickness of the component T near the transition between peripheral exterior surface 422b and side surface 426, and a lateral thickness $X_{GC}$ along side surface 426. The glass ceramic portion 440b therefore extends along at least a portion of the interior surface of the cover.

As shown in FIG. 4C, the peripheral zone 494 further includes peripheral exterior surface 422b and peripheral interior surface 424b. The glass ceramic portion 440b defines peripheral exterior surface 422b and side surface 426. Glass portion 430b defines a portion of peripheral interior surface 424b. As shown, each of peripheral exterior surface 422b and peripheral interior surface 424b are generally planar and opposite one another. Crystals 452 in FIG. 4C schematically represent the crystalline phase of the glass ceramic; the crystals 452 are not necessarily shown to scale. The compositions, phase amounts, and thicknesses of the glass ceramic portion and the glass portion may be as described for FIG. 2.

In some embodiments, a central zone of a cover or other enclosure component may have a different volume percent of the crystalline phase than the peripheral zone. As an example, a first partially crystallized glass ceramic portion, which may be in one of the central zone or the peripheral zone, comprises a first volume percentage of a first crystalline phase. A second partially crystallized glass ceramic portion, which may be in the other of the central zone or the peripheral zone, comprises a second volume percentage of a second crystalline phase. The second volume percentage may be greater than the first volume percentage.

Figure 5A:
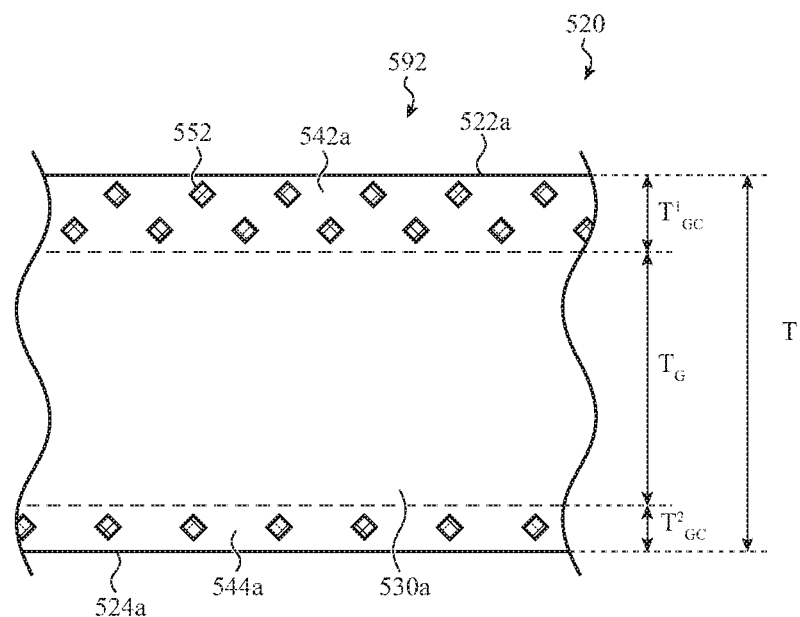
FIGS. 5A and 5B illustrate glass and glass ceramic portions in an additional example cover.
Figure 5B:
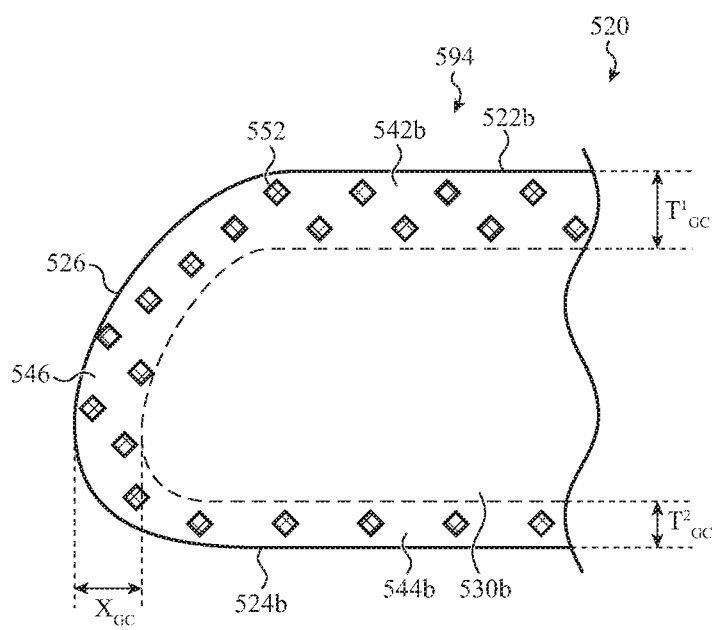

FIGS. 5A and 5B illustrate examples of glass and glass ceramic portions in an example cover including a first glass ceramic layer along an exterior surface of the cover and a second glass ceramic layer along an interior surface of the cover. As shown, the first glass ceramic layer has a thickness greater than that of the second glass ceramic layer. The thicker glass ceramic layer may provide the exterior surface of the cover with greater impact resistance as compared to the interior surface of the cover. The glass portion of the example cover is internal to the glass ceramic layers. The compositions, phase amounts, and thicknesses of the glass ceramic portion and the glass portion may be as described for FIG. 2.

FIG. 5A shows a detailed view of a central zone 592 of the cover 520. The central zone 592 includes portion 542a of the first glass ceramic layer and portion 544a of the second glass ceramic layer. Glass portion 530a is internal to the first and the second glass ceramic portions. Crystals 552 in FIG. 5A schematically represent the crystalline phase of the glass ceramic; the crystals 552 are not necessarily shown to scale. The compositions, phase amounts, and thicknesses of the glass ceramic portion and the glass portion may be as described for FIG. 2.

The central zone 592 further includes central exterior surface 522a and central interior surface 524a. The portion 542a of the first glass ceramic layer defines exterior surface 522a and portion 544a of the second glass ceramic defines central interior surface 524a. As shown, each of central exterior surface 522a and central interior surface 524a are generally planar and opposite one another. The thickness T of the component, the thickness $T^1_{GC}$ of the first glass ceramic layer, the thickness $T^2_{GC}$ of the second glass ceramic layer, and the thickness $T_G$ of the glass portion are also illustrated. As shown in FIG. 5A, the thickness $T^1_{GC}$ of the first glass ceramic layer is greater than the thickness $T^2_{GC}$ of the second glass ceramic layer and both $T^1_{GC}$ and $T^2_{GC}$ are less than the thickness $T_G$ of the glass portion.

FIG. 5B shows a detailed view of a peripheral zone 594 of the cover 520. The peripheral zone 594 includes portion 542b of the first glass ceramic layer and portion 544b of the second glass ceramic layer. Glass portion 530b is internal to the first and the second glass ceramic layers. Crystals 552 in FIG. 5B schematically represent the crystalline phase of the glass ceramic; the crystals 552 are not necessarily shown to scale. The compositions, phase amounts, and thicknesses of the glass ceramic portion and the glass portion may be as described for FIGS. 2 and 4A-4C.

The peripheral zone 594 further includes peripheral exterior surface 522b and peripheral interior surface 524b. Portion 542b of first glass ceramic layer defines peripheral exterior surface 522b and portion 544b of the second glass layer defines peripheral interior surface 524b. As shown, portion 546 of the first glass ceramic layer extends around the side surface 526 of the cover. As shown, each of peripheral exterior surface 522b and peripheral interior surface 524b are generally planar and opposite one another. The thickness $T^1_{GC}$ of the first glass ceramic portion and the thickness $T^2_{GC}$ of the second glass ceramic portion are also illustrated, as well as lateral thickness $X_{GC}$.

Figure 6A:
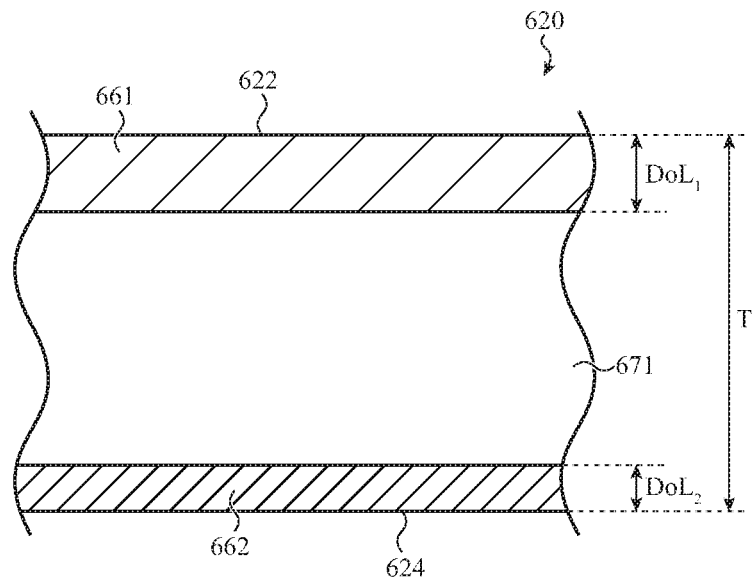
FIG. 6A shows a simplified cross-section view of an example cover having a region of compressive stress at an interior surface and at an exterior surface.

FIG. 6A shows a simplified partial cross-section view of an example cover 620 having a different residual compressive stress region at an exterior surface than at an interior surface. The residual internal compressive stress is present in the absence of an external load or force. As shown, first residual compressive stress region 661 along exterior surface 622 has a depth of layer $DoL_1$ greater than a depth of layer $DoL_2$ of second residual compressive stress region 662 along interior surface 624. The greater depth of layer of the first residual compressive stress region can provide greater crack resistance to the exterior surface than to the interior surface. A residual tensile stress region 671 is between the first and the second residual compressive stress regions (661, 662). For brevity, a residual compressive stress region may be referred to herein as a compressive stress region and a residual tensile stress region may be referred to herein as a tensile stress region. FIG. 6A also shows the thickness T of the cover 620.

Figure 6B:
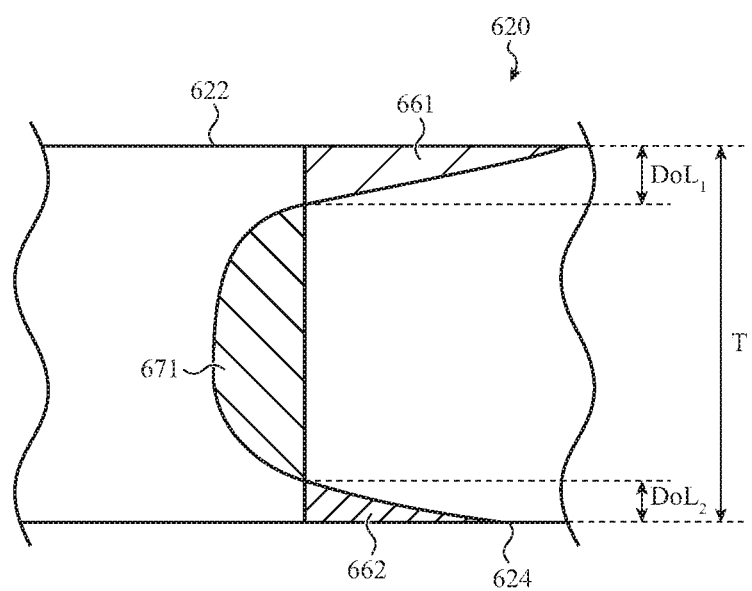
FIG. 6B shows an example of the variation of residual stress across the thickness for the cover of FIG. 6A.

FIG. 6B shows an example of the variation of residual stress across the thickness (T) for the cover of FIG. 6A. The cover 620 includes an internal tensile stress region 671, first compressive stress region 661 along exterior surface 622, and second compressive stress region 662 along interior surface 624.

As shown in FIG. 6B, the first compressive stress region 661 has a depth of layer $DoL_1$ greater than a depth of layer $DoL_2$ of second compressive stress region 662. In embodiments, a compressive stress region or layer may have a depth from about 10 microns to about 100 microns. As an example, the first compressive stress region 661 has a depth from 50 microns to about 100 microns and the second compressive stress region 662 has a depth from about 10 microns to less than 50 microns.

In embodiments, the second compressive stress region along the interior surface has a relatively high compressive surface stress even though the depth of the compressive stress layer is relatively small. By the way of example, the second compressive surface stress (CS) along interior surface 624 may be at least 75% of the first compressive surface stress at exterior surface 622, as illustrated in FIG. 6B. As another example, the compressive surface stress of the compressive stress layer along the interior surface of the cover may be greater than or equal to the compressive surface stress at the exterior surface. In some embodiments, the surface compressive stress along an interior surface of the glass article may be from 600 MPa to 800 MPa and the surface compressive stress along an exterior surface may be from 300 MPa to less than 600 MPa.

In embodiments, the first compressive stress region is located in the glass ceramic portion of the cover. Compressive stresses can form in the glass ceramic portion of the cover due, at least in part, to differences in thermal expansion between the glass ceramic portion, to ion exchange, or to a combination thereof. For example, the glass ceramic portion may comprise an at least partially crystallized glass ceramic having a first coefficient of thermal expansion, the glass portion may comprise a glass having a second coefficient of thermal expansion, and the first coefficient of thermal expansion may be less than the second coefficient of thermal expansion. In addition, when an at least partially crystallized glass ceramic is ion exchangeable, the at least partially crystallized glass ceramic may comprise a group of exchanged ions after ion exchange. The group of exchanged ions may cause a residual compressive stress in the glass ceramic portion.

Figure 7A:
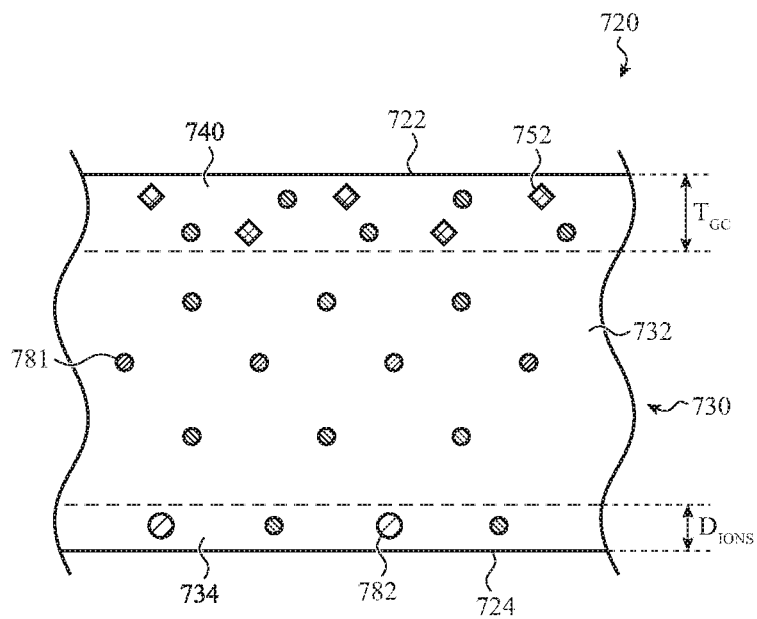
FIG. 7A shows an example cover after formation of a glass ceramic at an exterior surface and ion exchange to form a compressive stress layer at an interior surface.
Figure 7B:
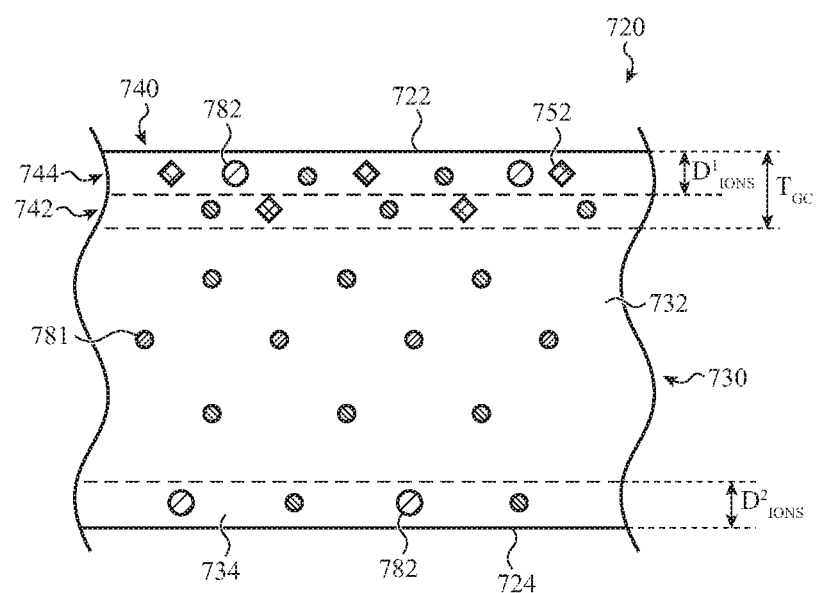
FIG. 7B shows an example cover after formation of a glass ceramic at an exterior surface and ion exchange at both the exterior and the interior surfaces.
Figure 7C:
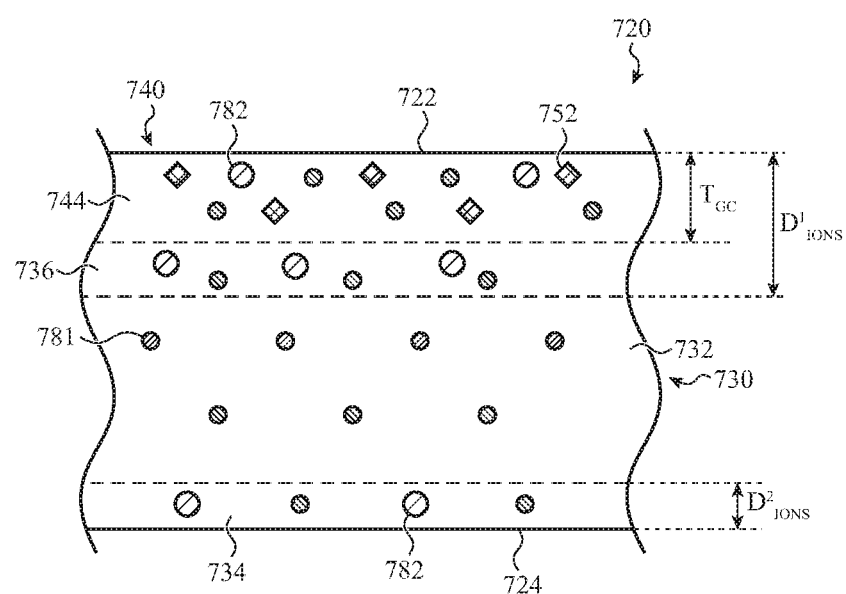
FIG. 7C shows another example cover after formation of a glass ceramic at an exterior surface and ion exchange at both the exterior and the interior surfaces.

In further embodiments, the second compressive stress region in the glass portion of the cover can be formed due to ion exchange. When the glass portion comprises an ion exchangeable glass, the glass may comprise a group of exchanged ions after ion exchange. The group of exchanged ions may cause a residual compressive stress in the glass portion. Examples of glass ceramic portions and glass portions including exchanged ions are schematically shown in FIGS. 7A-7C and described below. The method for achieving the ion exchange may be similar to that described with respect to FIG. 14.

FIG. 7A shows a simplified partial cross-section view of an example cover including a glass ceramic portion and an ion exchanged glass portion. As shown, cover 720 has a glass ceramic portion 740 at an exterior surface 722 and a glass portion 730 at interior surface 724. The glass portion 730 includes an ion exchanged region 734; compressive stresses may be formed in the ion exchanged region as previously discussed.

The glass portion 730 includes an ion exchanged region 734 and a region 732 which has not been substantially ion exchanged. As shown, both ion exchanged region 734 and a region 732 comprise first alkali metal ions 781. As compared to region 732, ion exchanged region 734 is depleted with respect to first alkali metal ions 781 and enriched with respect to second alkali metal ions 782. As shown, second alkali metal ions 782 are larger than first alkali metal ions 781; the exchange of larger alkali metal ions for smaller alkali metal ions in the glass can create compressive stresses in ion exchanged region 734. The ion exchanged region extends to depth $D_{IONS}$ along interior surface 724. In this example, the second alkali metal ions may be termed exchanged ions.

The glass ceramic portion 740 has a thickness $T_{GC}$. Crystals 752 in FIG. 7A schematically represent the crystalline phase of the glass ceramic; the crystals 752 are not necessarily shown to scale. The compositions, phase amounts, and thicknesses of the glass ceramic portion and the glass portion may be as described for FIG. 2.

As shown in FIG. 7A, glass ceramic portion 740 also includes first alkali metal ions 781. As previously discussed, compressive stresses can form in the glass ceramic portion of the cover due to differences in thermal expansion between the glass ceramic portion and the glass portion. As a result of the compressive stresses formed in the glass ceramic portion of the cover and the ion exchanged region of the glass, tensile stresses may be formed in region 732 which has not been substantially ion exchanged.

FIG. 7B shows a simplified partial cross-section view of an example cover including an ion exchanged glass ceramic portion and an ion exchanged glass portion. The ion exchanged glass ceramic portion may provide additional compressive stress along the exterior surface of the cover as compared to the example cover of FIG. 7A.

As shown in FIG. 7B, cover 720 has a glass ceramic portion 740 at an exterior surface 722 and a glass portion 730 at an interior surface 724. The glass portion 730 includes an ion exchanged region 734; compressive stresses may be formed in the ion exchanged region as previously discussed. The glass ceramic portion 740 includes an ion exchanged portion 744; compressive stresses may be formed in the ion exchanged region as previously discussed.

The glass portion 730 includes an ion exchanged region 734 and a region 732 which has not been substantially ion exchanged. As shown, both ion exchanged region 734 and region 732 comprise first alkali metal ions 781. As compared to region 732, ion exchanged region 734 is depleted with respect to first alkali metal ions 781 and enriched with respect to second alkali metal ions 782. As shown, second alkali metal ions 782 are larger than first alkali metal ions 781; the exchange of larger alkali metal ions for smaller alkali metal ions can create compressive stresses in ion exchanged region 734. The ion exchanged region extends to depth $D^2_{IONS}$ along interior surface 724. In this example, the second alkali metal ions may be termed exchanged ions.

The glass ceramic portion 740 includes an ion exchanged region 744 and a region 742 which has not been substantially ion exchanged. As shown, both ion exchanged region 744 and region 742 comprise first alkali metal ions 781. As compared to region 742, ion exchanged region 744 is depleted with respect to first alkali metal ions 781 and enriched with respect to second alkali metal ions 782. As shown, second alkali metal ions 782 are larger than first alkali metal ions 781; the exchange of larger alkali metal ions for smaller alkali metal ions can create compressive stresses in ion exchanged region 744. The ion exchanged region extends to depth $D^1_{IONS}$ along exterior surface 722.

As shown in FIG. 7B, the depth $D^1_{IONS}$ of ion exchanged region 744 in the glass ceramic portion is substantially equal to the depth $D^2_{IONS}$ of ion exchanged region 734 in the glass portion. However, the example of FIG. 7B is not intended to be limiting and the depth of ion exchanged region 744 in the glass ceramic portion may be less than or greater than the depth of ion exchanged region 744 in the glass portion. The glass ceramic portion 740 has a thickness $T_{GC}$. Crystals 752 in FIG. 7B schematically represent the crystalline phase of the glass ceramic; the crystals 752 are not necessarily shown to scale.

FIG. 7C shows a simplified partial cross-section view of an example cover including an ion exchanged glass ceramic portion and an ion exchanged glass portion, where the exterior surface 722 is ion exchanged to a greater depth than the interior surface 724. As shown in FIG. 7C, the depth of the ion exchange at exterior surface 722 may extend past the thickness $T_{GC}$ of the glass ceramic portion 740. The ion exchanged glass ceramic portion may provide a deeper compressive stress region along the exterior surface of the cover as compared to the example covers of FIG. 7A and FIG. 7B.

As shown in FIG. 7C, cover 720 has a glass ceramic portion 740 at an exterior surface 722 and a glass portion 730 at an interior surface 724. The glass portion 730 includes an ion exchanged region 734, a glass portion of the ion exchanged region 736, and a region 732 which has not been substantially ion exchanged. Compressive stresses may be formed in the ion exchanged regions as previously discussed. The glass ceramic portion 740 includes an ion exchanged portion 744 of ion exchanged region 736; compressive stresses may be formed in the ion exchanged region as previously discussed.

Glass portion 730 includes ion exchanged region 734, region 732 which has not been substantially ion exchanged, and a glass portion of the ion exchanged region 736, all of which comprise first alkali metal ions 781. As compared to region 732, ion exchanged region 734 and the glass portion of ion exchanged region 736 are depleted with respect to first alkali metal ions 781 and enriched with respect to second alkali metal ions 782. As shown, second alkali metal ions 782 are larger than first alkali metal ions 781; the exchange of larger alkali metal ions for smaller alkali metal ions in the glass can create compressive stresses in ion exchanged region 734. The ion exchanged region 734 extends to depth $D^2_{IONS}$ along interior surface 724. In this example, the second alkali metal ions may be termed exchanged ions.

The glass ceramic portion 740 includes an ion exchanged region 744. As shown, ion exchanged region 744 comprises first alkali metal ions 781. As compared to region 732, ion exchanged region 744 is depleted with respect to first alkali metal ions 781 and enriched with respect to second alkali metal ions 782. As shown, second alkali metal ions 782 are larger than first alkali metal ions 781; the exchange of larger alkali metal ions for smaller alkali metal ions in the glass can create compressive stresses in ion exchanged region 744. The ion exchanged region 736 extends to depth $D^1_{IONS}$ along exterior surface 722. As shown, the depth of ion exchanged region 744 in the glass ceramic portion is greater than the depth of ion exchanged region 734 in the glass portion. However, the example of FIG. 7C is not intended to be limiting and the depth of ion exchanged region 744 in the glass ceramic portion may be less than or substantially equal to the depth of ion exchanged region 734 in the glass portion. The glass ceramic portion 740 has a thickness $T_{GC}$. Crystals 752 in FIG. 7C schematically represent the crystalline phase of the glass ceramic; the crystals 752 are not necessarily shown to scale. The greater depth of the ion exchanged region 736 along the exterior surface may be greater than shown in FIG. 7B.

Figure 8:
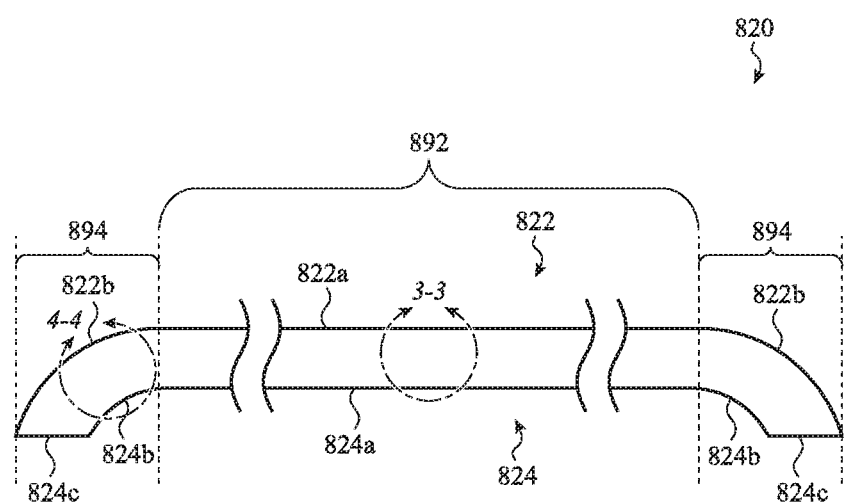
FIG. 8 shows a simplified cross-section view of another example cover.

FIG. 8 shows a simplified cross-section view of another example cover 820 including interior and exterior surfaces which are generally planar in a central zone of the cover and curved in a peripheral zone of the cover. As shown, the interior and exterior surfaces in the peripheral zone generally curve towards the interior of the electronic device. In other words, the curves defined by the interior and exterior surfaces in the peripheral zone are concave with respect to an interior of the electronic device.

Cover 820 includes central zone 892 and peripheral zone 894; central zone 892 and peripheral zone 894 are contiguous. Central zone 892 includes central exterior surface 822a and central interior surface 824a. Peripheral zone 894 includes peripheral exterior surface 822b, transitional interior surface 824b, and peripheral interior surface 824c. Peripheral interior surface 824c is offset from central interior surface 824a; transitional interior surface 824b provides a transition between peripheral interior surface 824c and central interior surface 824a. Alternately, peripheral interior surface 824c may be referred to as a first (or second) peripheral interior surface and transitional interior surface 824b may be referred to as a second (or first) peripheral interior surface. Inset 3-3 is located in the central zone and inset 4-4 is located in the peripheral zone.

Figure 9A:
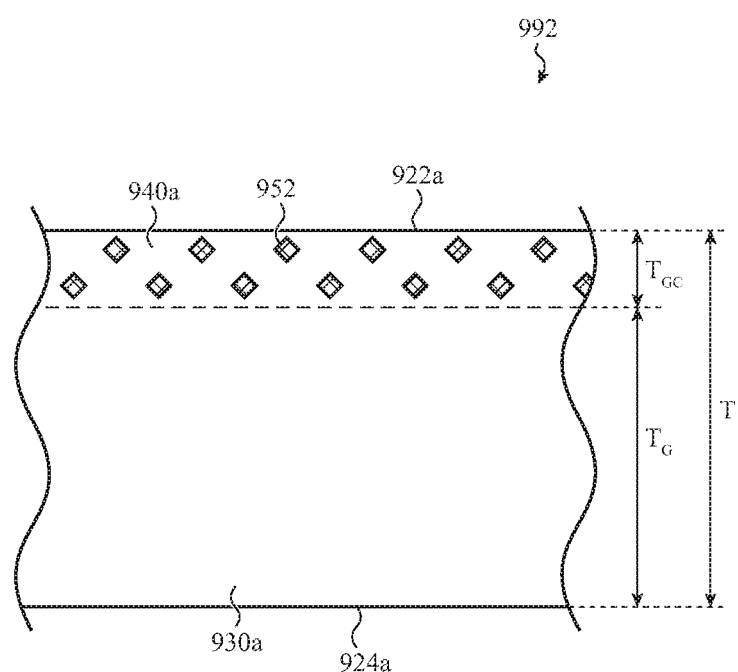
FIGS. 9A, 9B, and 9C illustrate glass and glass ceramic portions in example covers.
Figure 9B:
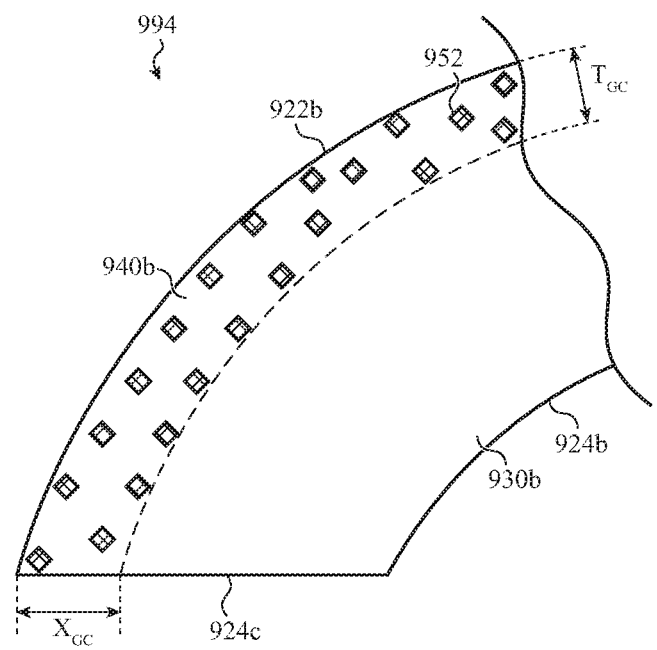
Figure 9C:
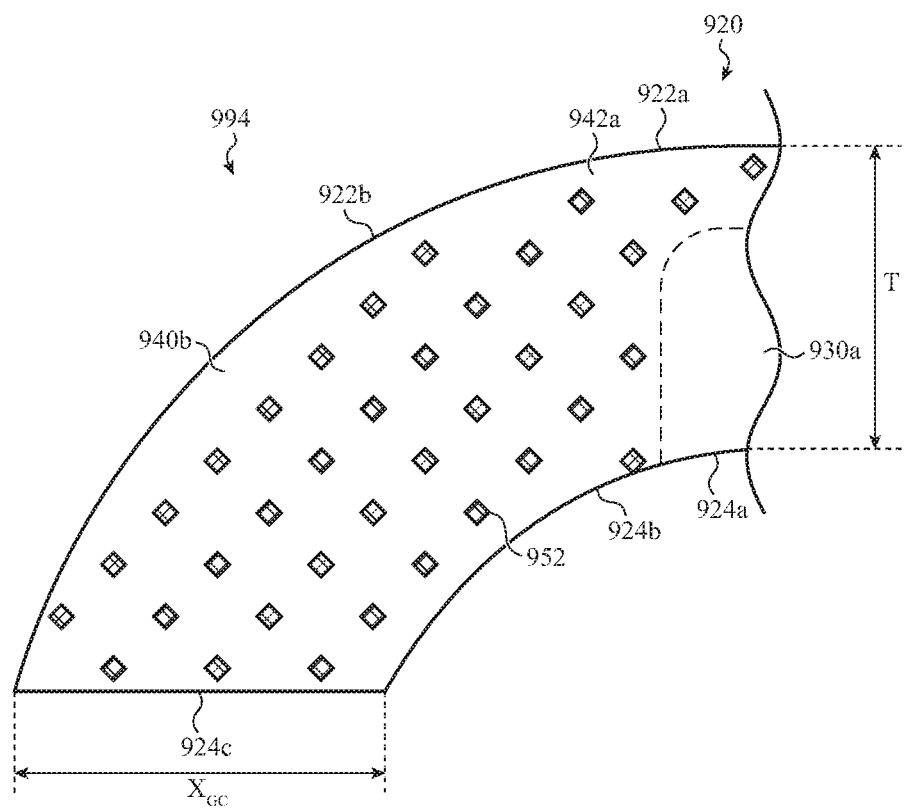

FIGS. 9A, 9B, and 9C illustrate example covers including a glass ceramic region at an exterior surface of the cover and a glass region at an interior surface of the cover. FIG. 9A shows a detailed view of the inset 3-3 of FIG. 8 for an example cover including a glass portion 930a and a glass ceramic portion 940a in central zone 992. The glass ceramic portion may include a residual glass phase and one or more crystalline phases. Crystals 952 in FIG. 9A schematically represent the crystalline phase of the glass ceramic; the crystals 952 are not necessarily shown to scale. The compositions, phase amounts, and thicknesses of the glass ceramic portion and the glass portion may be as described for FIG. 2.

The central zone 992 further includes central exterior surface 922a and central interior surface 924a. The glass ceramic portion 940a defines central exterior surface 922a and the glass portion 930a defines central interior surface 924a. As shown, each of central exterior surface 922a and central interior surface 924a are generally planar and opposite one another. The thickness T of the component, the thickness $T_{GC}$ of the glass ceramic portion, and the thickness $T_G$ of the glass portion in the central portion are also illustrated. As shown, the thickness of the glass ceramic portion is less than the thickness of the glass portion.

FIG. 9B shows a detailed view of the inset 4-4 of FIG. 8 for an example cover including a glass portion 930b and a glass ceramic portion 940b in peripheral zone 994. As shown, the glass ceramic portion 940b extends along peripheral exterior surface 922b to peripheral interior surface 924c.

As shown in FIG. 9B, the peripheral zone 994 further includes peripheral exterior surface 922b, transitional interior surface 924b, and peripheral interior surface 924c. Peripheral interior surface 924c is offset from central interior surface 924a (see FIG. 9A); transitional interior surface 924b provides a transition between peripheral interior surface 924c and central interior surface 924a. Each of peripheral exterior surface 922b and transitional interior surface 924b are curved. As shown in FIG. 9B, peripheral exterior surface 922b comprises a first curved region and transitional interior surface 924b comprises a second curved region. Each of the first curved region and the second curved region may be concave with respect to an interior of the electronic device The glass ceramic portion 940b defines peripheral exterior surface 922b and a part of peripheral interior surface 924c. Glass portion 930b defines a remainder of peripheral interior surface 924c and defines transitional interior surface 924b. Crystals 952 in FIG. 9B schematically represent the crystalline phase of the glass ceramic; the crystals 952 are not necessarily shown to scale. The compositions, phase amounts, and thicknesses of the glass ceramic portion and the glass portion may be as described for FIGS. 2 and 4A-4C. A thickness TGC and a lateral thickness XGC of the glass ceramic portion is also shown In further embodiments where the central zone comprises a first partially crystallized ceramic portion extending into the cover to a first thickness and the peripheral zone comprises a second partially crystallized ceramic portion extending to a second thickness different than the first thickness, the central zone may comprise a first glass portion and the peripheral zone may comprise a second glass portion extending along the interior surface of the cover. For example, when the second thickness (of the second partially crystallized ceramic portion) is greater than the first thickness (of the first partially crystallized ceramic portion), a thickness of the second glass portion may be less than that of the first glass portion. The second glass portion may extend along a transitional interior surface similar to 924*b* and a portion of a peripheral interior surface similar to 924*c*.

FIG. 9C shows a detailed view of the peripheral zone 994 of another example cover in which the glass portion 930*a* of the central zone does not substantially extend into the peripheral zone 994. As shown, the glass ceramic portion 940*b* defines the peripheral zone 994 and the thickness of the glass ceramic portion is substantially equal to a thickness T of the cover in the peripheral zone. The glass ceramic portion 940*b* has a lateral thickness $X_{GC}$ along peripheral internal surface 924*c*. The increased thickness of glass ceramic portion 940*b* as compared to glass ceramic portion 940*a* can provide increased impact resistance and strength to the peripheral zone of the cover.

As shown in FIG. 9C, the peripheral zone 994 includes peripheral exterior surface 922*b*, transitional interior surface 924*b*, and peripheral interior surface 924*c*. Each of peripheral exterior surface 922*b* and transitional interior surface 924*b* are curved. As shown in FIG. 9C, peripheral exterior surface 922*b* comprises a first curved region and transitional interior surface 924*b* comprises a second curved region. Each of the first curved region and the second curved region may be concave with respect to an interior of the electronic device.

The glass ceramic portion 940*b* defines each of peripheral exterior surface 922*a*, transitional interior surface 924*b*, and peripheral interior surface 924*c*. Peripheral interior surface 924*c* is offset from central interior surface 924*a*. Crystals 952 in FIG. 9C schematically represent the crystalline phase of the glass ceramic; the crystals 952 are not necessarily shown to scale. The compositions, phase amounts, and thicknesses of the glass ceramic portion and the glass portion may be as described for FIGS. 2 and 4A-4C.

Figure 10A:
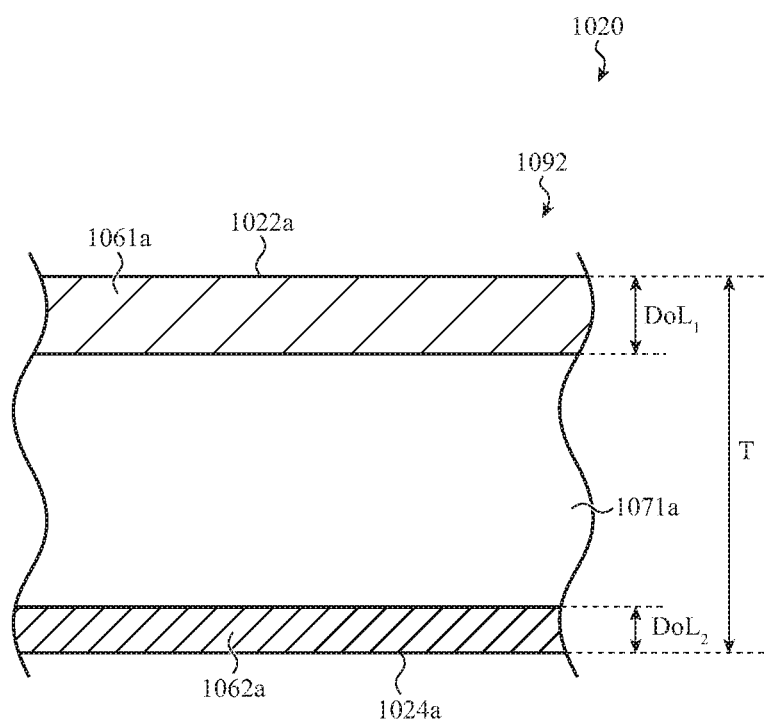
FIGS. 10A and 10B show simplified cross-section views of an example cover having a region of compressive stress at an interior surface and at an exterior surface.

FIG. 10A shows a simplified partial cross-section view of a central portion 1092 of an example cover 1020 having a different residual compressive stress region at an exterior surface than at an interior surface. As shown, first residual compressive stress region 1061*a* along exterior surface 1022*a* has a depth of layer $DoL_1$ greater than a depth of layer $DoL_2$ of second residual compressive stress region 1062*a* along interior surface 1024*a*. The greater depth of layer of the first residual compressive stress region can provide greater crack resistance to the exterior surface than to the interior surface. A residual tensile stress region 1071*a* is between the first and the second residual compressive stress regions (1061*a*, 1062*a*). The cover 1020 has thickness T.

As shown, the first compressive stress region 1061*a* has a depth of layer $DoL_1$ greater than a depth of layer $DoL_2$ of second compressive stress region 1062*a*. In embodiments, the compressive stress region along the interior surface has a relatively high compressive surface stress even though the depth of the compressive stress layer is relatively small. By the way of example, the second compressive surface stress (CS) along interior surface 1024*a* may be at least 75% of the first compressive surface stress at exterior surface 1022*a*. As another example, the compressive surface stress of the compressive stress layer along the interior surface(s) of the cover may be greater than or equal to the compressive surface stress at the exterior surface. In some embodiments, the surface compressive stress along an interior surface of the glass article may be from 600 MPa to 800 MPa and the surface compressive stress along an exterior surface may be from 300 MPa to less than 600 MPa. A compressive stress region or layer may have a depth from about 10 microns to about 100 microns. As an example, the first compressive stress region has a depth from 50 microns to about 100 microns and the second compressive stress region has a depth from about 10 microns to less than 50 microns.

In some embodiments, the first compressive stress region is located in the glass ceramic portion of the cover and the second compressive stress region is located in the glass portion of the cover. As previously discussed, compressive stresses can form in the glass ceramic portion of the cover due to differences in thermal expansion between the glass ceramic portion and the glass portion, due to ion exchange, or due to a combination thereof. Compressive stresses in the glass portion of the cover can be formed due to ion exchange.

Figure 10B:
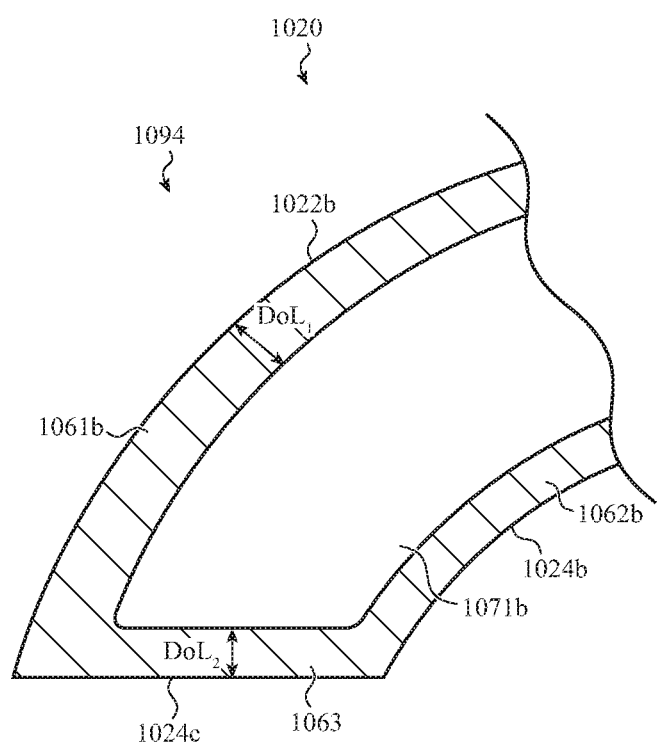

FIG. 10B shows a simplified partial cross-section view of a peripheral portion 1094 of an example cover 1020 having a different residual compressive stress region at an exterior surface than at an interior surface. As shown, first residual compressive stress region 1061*b* along exterior surface 1022*b* has a depth of layer $DoL_1$ greater than a depth of layer $DoL_2$ of second residual compressive stress region 1062*b* along interior surface 1024*b*. The depth of layer $DoL_2$ of compressive stress region 1063 along a part of interior surface 1024*c* is also less than $DoL_1$. The greater depth of layer of the first residual compressive stress region 1061*b* can provide greater crack resistance to the exterior surface than to the interior surface. A residual tensile stress region 1071*b* is between the first and the second residual compressive stress regions (1061*b*, 1062*b*).

As shown in FIG. 10B, the first compressive stress region 1061*b* has a depth of layer $DoL_1$ greater than a depth of layer $DoL_2$ of second compressive stress region 1062*b*. In embodiments, the second compressive stress region 1062*b* along the interior surface 1024*b* has a relatively high compressive surface stress even though the depth of the compressive stress layer is relatively small. By the way of example, the compressive surface stress (CS) along interior surfaces 1024*b* and 1024*c* may be at least 75% of the compressive surface stress at exterior surface 1022*b*. As another example, the compressive surface stress of the compressive stress layer along the interior surface of the cover may be greater than or equal to the compressive surface stress at the exterior surface. In some embodiments, the surface compressive stress along an interior surface of the glass article may be from 600 MPa to 800 MPa and the surface compressive stress along an exterior surface may be from 300 MPa to less than 600 MPa. A compressive stress region or layer may have a depth from about 10 microns to about 100 microns. As an example, the first compressive stress region has a depth from 50 microns to about 100 microns and the second compressive stress region has a depth from about 10 microns to less than 50 microns.

In some embodiments, the first compressive stress region is located in the glass ceramic portion of the cover and the second compressive stress region is located in the glass portion of the cover. The third compressive stress region may be located in the glass portion of the cover or the glass ceramic portion of the cover. As previously discussed, compressive stresses can form in the glass ceramic portion of the cover due to differences in thermal expansion between the glass ceramic portion and the glass portion, due to ion exchange, or due to a combination thereof. Compressive stresses in the glass portion of the cover can be formed due to ion exchange.

Examples of glass ceramic portions and glass portions including exchanged ions are schematically shown in FIGS. 7A-7C and described above. Formation of the compressive stresses in the glass or the glass ceramic portion of the cover may be similar to that described for FIGS. 6A-6B above. In additional embodiments, the central zone comprises a first partially crystallized glass ceramic portion and the peripheral zone comprises a second partially crystallized glass ceramic portion. The first partially crystallized glass ceramic portion may comprise first exchanged ions within the second compressive stress region and the second partially crystallized glass ceramic portion may comprise second exchanged ions within the third compressive stress region. The method for achieving the ion exchange may be similar to that described with respect to FIG. 14.

Figure 11:
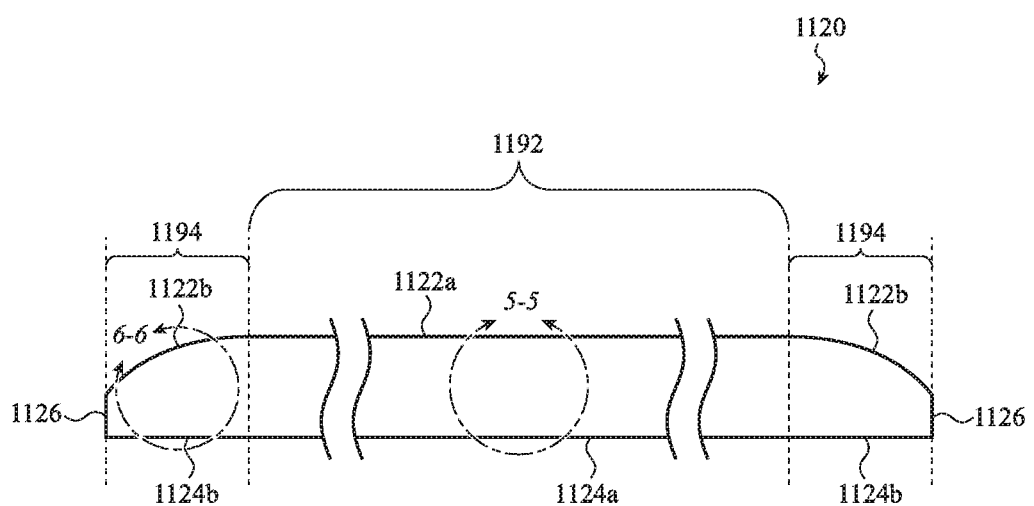
FIG. 11 shows a simplified cross-section view of an additional example cover.

FIG. 11 shows a simplified cross-section view of another example cover 1120 including interior and exterior surfaces which are generally planar in a central zone of the cover and an exterior surface which is curved in a peripheral zone of the cover. As shown, the exterior surface in the peripheral zone generally curves towards the interior of the electronic device. In other words, the curve defined by the exterior surface in the peripheral zone is concave with respect to an interior of the electronic device. In additional embodiments, the exterior surface in the peripheral zone may comprise a curved region and a planar region.

Cover 1120 includes central zone 1192 and peripheral zone 1194; central zone 1192 and peripheral zone 1194 are contiguous. Central zone 1192 includes central exterior surface 1122a and central interior surface 1124a. Peripheral zone 1194 includes peripheral exterior surface 1122b, side surface 1126, and peripheral interior surface 1124b. Inset 5-5 is located in the central zone and inset 6-6 is located in the peripheral zone.

Figure 12A:
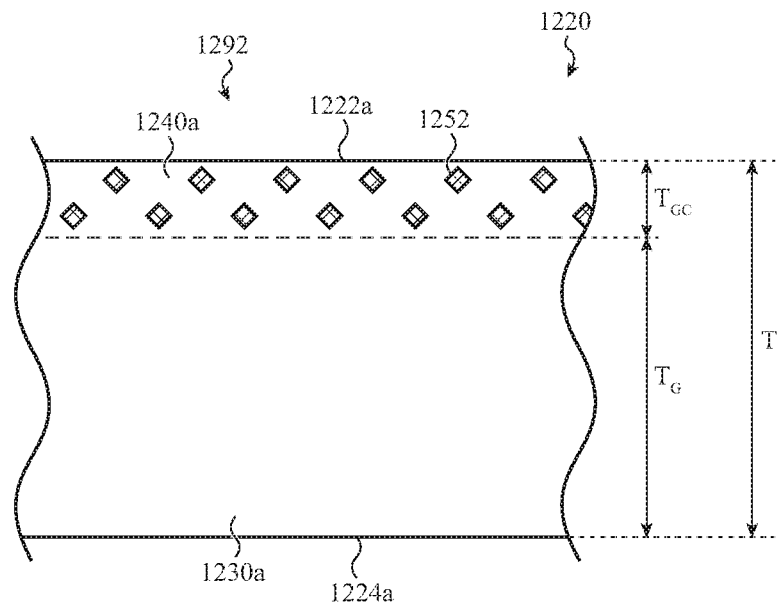
FIGS. 12A, 12B, and 12C illustrate glass and glass ceramic portions of additional example covers.
Figure 12B:
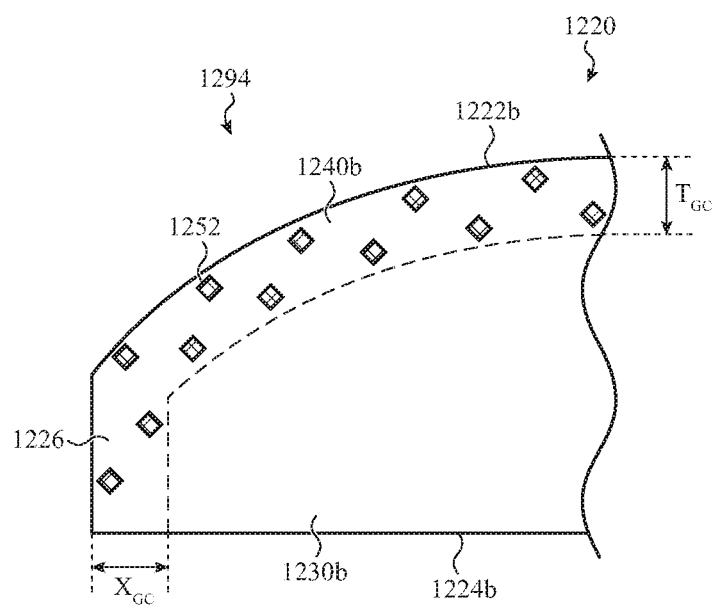
Figure 12C:
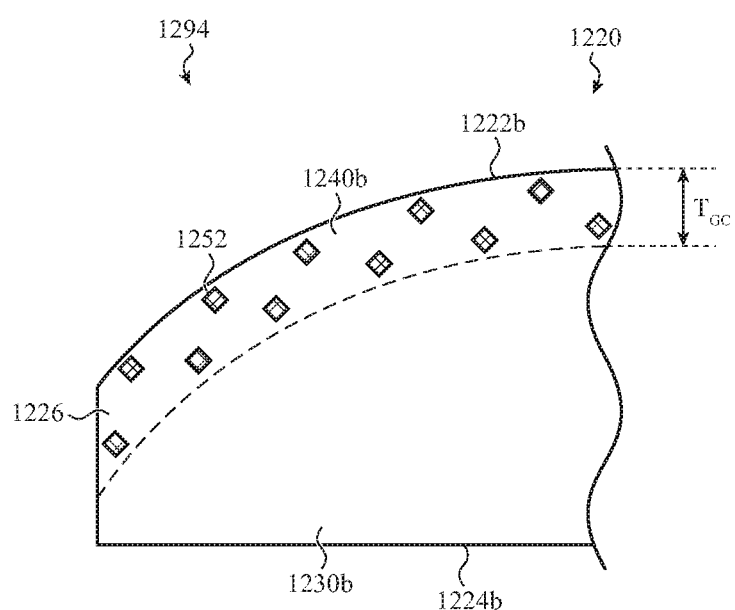

FIGS. 12A, 12B, and 12C illustrate example covers including a glass ceramic region at an exterior surface of the cover and a glass region at an interior surface of the cover. FIG. 12A shows a detailed view of the inset 5-5 of FIG. 11 for an example cover including a glass portion 1230a and a glass ceramic portion 1240a in central zone 1292. The glass ceramic portion may include a residual glass phase and one or more crystalline phases. Crystals 1252 in FIG. 12A schematically represent the crystalline phase of the glass ceramic; the crystals 1252 are not necessarily shown to scale. The compositions, phase amounts, and thicknesses of the glass ceramic portion and the glass portion may be as described for FIG. 2.

The central zone 1292 further includes central exterior surface 1222a and central interior surface 1224a. The glass ceramic portion 1240a defines central exterior surface 1222a and the glass portion 1230a defines central interior surface 1224a. As shown, each of central exterior surface 1222a and central interior surface 1224a are generally planar and opposite one another. The thickness T of the component, the thickness $T_{GC}$ of the glass ceramic portion, and the thickness $T_G$ of the glass portion in the central portion are also illustrated. The thickness of the glass ceramic portion is shown as less than the thickness of the glass portion.

FIG. 12B shows a detailed view of the inset 6-6 of FIG. 11 for an example cover including a glass portion 1230b and a glass ceramic portion 1240b in peripheral zone 1294. As shown, the glass ceramic portion 1240b extends along peripheral exterior surface 1222b and along side surface 1226 to peripheral interior surface 1224b. The thickness $T_{GC}$ of the glass ceramic portion is substantially constant along peripheral exterior surface 1222b. The glass portion 1230b varies in thickness so that peripheral exterior surface 1222b is curved rather than planar. Due to the variation in thickness of glass portion 1230b, the thickness of the component decreases as it approaches side surface 1226. In additional embodiments, the exterior surface in the peripheral zone may comprise a curved region and a planar region.

The peripheral zone 1294 includes peripheral exterior surface 1222b, side surface 1226, and peripheral interior surface 1224b. The glass ceramic portion 1240b defines peripheral exterior surface 1222b, side surface 1226, and a part of peripheral interior surface 1224b. Glass portion 1230b defines a remainder of peripheral interior surface 1224b. Crystals 1252 in FIG. 12B schematically represent the crystalline phase of the glass ceramic; the crystals 1252 are not necessarily shown to scale. The compositions, phase amounts, and thicknesses of the glass ceramic portion and the glass portion may be as described for FIGS. 2 and 4A-4C. A lateral thickness XGC of the glass ceramic portion is also shown and is substantially equal to thickness TGC.

FIG. 12C shows a detailed view of a peripheral region 1294 of another example cover 1220. As shown, glass ceramic portion 1240b extends along peripheral exterior surface 1222b and a portion of side surface 1226. The thickness $T_{GC}$ of the glass ceramic portion is substantially constant along peripheral exterior surface 1222b. The glass portion 1230b varies in thickness so that peripheral exterior surface 1222b is curved rather than planar. Due to the variation in thickness of glass portion 1230b, the thickness of the component decreases as it approaches side surface 1226. In additional embodiments, the exterior surface in the peripheral zone may comprise a curved region and a planar region.

As shown the peripheral zone 1294 includes peripheral exterior surface 1222b, side surface 1226, and peripheral interior surface 1224b. The glass ceramic portion 1240b defines peripheral exterior surface 1222b and part of side surface 1226. Crystals 1252 in FIG. 12C schematically represent the crystalline phase of the glass ceramic; the crystals 1252 are not necessarily shown to scale. The compositions, phase amounts, and thicknesses of the glass ceramic portion and the glass portion may be as described for FIGS. 2 and 4A-4C.

Figure 13A:
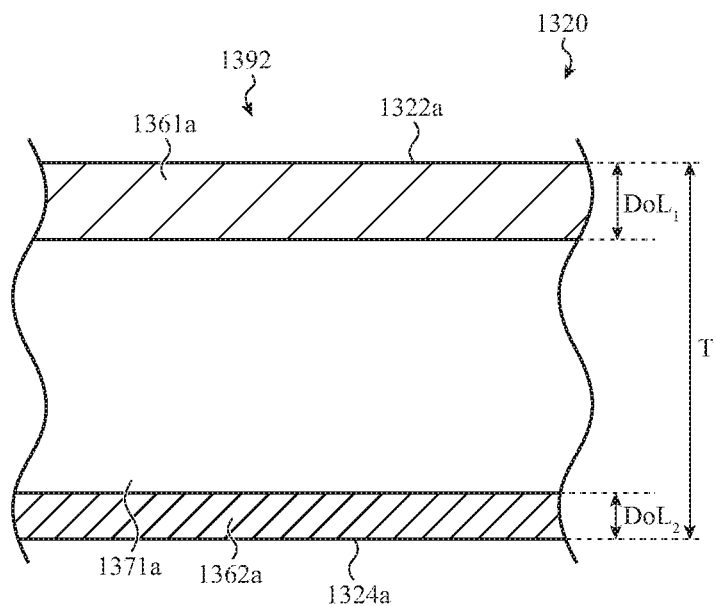
FIGS. 13A and 13B show simplified cross-section views of an example cover having a region of compressive stress at an interior surface and at an exterior surface.

FIG. 13A shows a simplified partial cross-section view of a central portion 1392 of an example cover 1320 having a different residual compressive stress region at an exterior surface than at an interior surface. As shown, first residual compressive stress region 1361a along exterior surface 1322a has a depth of layer $DoL_1$ greater than a depth of layer $DoL_2$ of second residual compressive stress region 1362a along interior surface 1324a. The greater depth of layer of the first residual compressive stress region 1361a can provide greater crack resistance to the exterior surface than to the interior surface. A residual tensile stress region 1371a is between the first and the second residual compressive stress regions (1361a, 1362a). The cover 1320 has thickness T.

As shown in FIG. 13A, the first compressive stress region 1361a has a depth of layer $DoL_1$ greater than a depth of layer $DoL_2$ of second compressive stress region 1362a. In embodiments, the compressive stress region along the interior surface has a relatively high compressive surface stress even though the depth of the compressive stress layer is relatively small. By the way of example, the second compressive surface stress (CS) along interior surface 1324a may be at least 75% of the first compressive surface stress at exterior surface 1322a. As another example, the compressive surface stress of the compressive stress layer along the interior surface(s) of the cover may be greater than or equal to the compressive surface stress at the exterior surface. In some embodiments, the surface compressive stress along an interior surface of the glass article may be from 600 MPa to 800 MPa and the surface compressive stress along an exterior surface may be from 300 MPa to less than 600 MPa. A compressive stress region or layer may have a depth from about 10 microns to about 100 microns. As an example, the first compressive stress region has a depth from 50 microns to about 100 microns, and the second compressive stress region has a depth from about 10 microns to less than 50 microns.

In some embodiments, the first compressive stress region is located in the glass ceramic portion of the cover and the second compressive stress region is located in the glass portion of the cover. As previously discussed, compressive stresses can form in the glass ceramic portion of the cover due to differences in thermal expansion between the glass ceramic portion and the glass portion, due to ion exchange, or due to a combination thereof. Compressive stresses in the glass portion of the cover can be formed due to ion exchange.

Figure 13B:
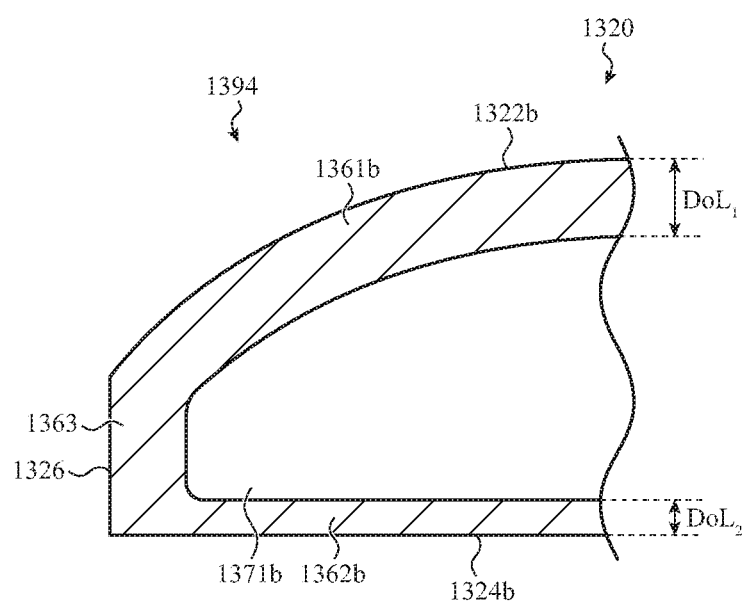

FIG. 13B shows a simplified partial cross-section view of a peripheral portion 1394 of an example cover 1320 having a different residual compressive stress region at an exterior surface than at an interior surface. As shown, first residual compressive stress region 1361b along exterior surface 1322b has a depth of layer $DoL_1$ greater than a depth of layer $DoL_2$ of second residual compressive stress region 1362b along interior surface 1324b. The depth of layer $DoL_1$ of third compressive stress region 1363 along side surface 1326 is also greater than a depth of layer $DoL_2$ of second residual compressive stress region 1362b along interior surface 1324b. The greater depth of layer of the first and the third residual compressive stress regions can provide greater crack resistance to the exterior surface and to the side surface than to the interior surface. A residual tensile stress region 1371b is between the first and the second residual compressive stress regions (1361b, 1362b). The cover 1320 has a thickness that decreases towards side surface 1326

As shown in FIG. 13B, the first compressive stress region 1361b and third compressive stress region 1363 each have a depth of layer $DoL_1$ greater than a depth of layer $DoL_2$ of second compressive stress region 1362b. In embodiments, the second compressive stress region along the interior surface has a relatively high compressive surface stress even though the depth of the compressive stress layer is relatively small. By the way of example, the second compressive surface stress (CS) along interior surface 1324b may be at least 75% of the first compressive surface stress at exterior surface 1322b. As another example, the compressive surface stress of the compressive stress layer along the interior surface of the cover may be greater than or equal to the compressive surface stress at the exterior surface. In some embodiments, the surface compressive stress along an interior surface of the glass article may be from 600 MPa to 800 MPa and the surface compressive stress along an exterior surface may be from 300 MPa to less than 600 MPa. A compressive stress region or layer may have a depth from about 10 microns to about 100 microns. As an example, the first compressive stress region has a depth from about 50 microns to about 100 microns and the second compressive stress region has a depth from about 10 microns to less than 50 microns.

In some embodiments, the first compressive stress region is located in the glass ceramic portion of the cover and the second compressive stress region is located in the glass portion of the cover. In further embodiments, the third compressive stress region may be located in the glass portion of the cover or the glass ceramic portion of the cover. As previously discussed, compressive stresses can form in the glass ceramic portion of the cover due to differences in thermal expansion between the glass ceramic portion and the glass portion, due to ion exchange, or due to a combination thereof. Compressive stresses in the glass portion of the cover can be formed due to ion exchange.

Examples of glass ceramic portions and glass portions including exchanged ions are schematically shown in FIGS. 7A-7C and described above. Formation of the compressive stresses in the glass or the glass ceramic portion of the cover may be similar to that described for FIGS. 6A-6B and 10A-10B above. The method for achieving the ion exchange may be similar to that described with respect to FIG. 14.

Figure 14:
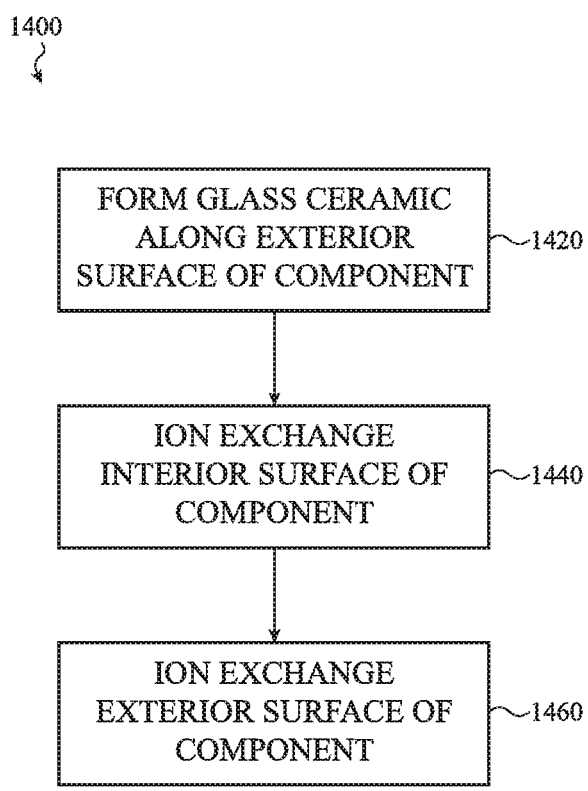
FIG. 14 shows a flowchart of a process for making a component according to one embodiment.

FIG. 14 shows a flowchart of an example process 1400 using localized control of bulk materials properties to produce a component including a glass ceramic portion and a glass portion. Process 1400 includes selective crystallization of a glass component to form a glass ceramic portion and ion exchange of at least a glass portion of the component. For example, process 1400 may be used to form the component of FIGS. 7A-7C.

In embodiments, the glass component is capable of crystallization to form a glass ceramic portion. For example, the glass may be an aluminosilicate glass capable of forming an aluminosilicate glass ceramic or a boroaluminosilicate glass capable of forming a boroaluminosilicate glass ceramic. For example, the glass ceramic may be a lithium aluminosilicate (LAS). In embodiments, the glass ceramic portion may include a residual glass phase and crystals of one or more crystalline phases. The volume percentage of the crystals may be low enough to prevent cracking of the residual glass phase during cooling of the glass ceramic to room temperature (e.g., about 20° C.) but high enough to create a residual compressive stress. The crystals may be small enough so that the cover remains transparent to visible radiation.

The process 1400 may include operation 1420 of forming a glass ceramic along an exterior surface of a glass component. The resulting component comprises a glass ceramic portion and a glass portion. In embodiments, the operation of forming the glass ceramic may include the operation of creating crystal nuclei followed by the operation of growing the crystal nuclei to form crystals of a desired size. The operation of creating the crystal nuclei may comprise heating a portion of the glass component along the exterior surface to a first temperature at which crystal nuclei form. The operation of growing the crystal nuclei may comprise heating the portion of the glass component to a second temperature. The second temperature may be greater than the first temperature. In embodiments, the glass component may be heated to a temperature from 500° C. to 1000° C. during a nucleation step and from 550° C. to 1050° C. during a crystallization step.

In embodiments, a region of the glass component along the exterior surface (e.g., a surface region) is selectively heated so that nucleation and/or growth of crystals in an adjacent region of the glass component occurs to a lesser extent. The glass ceramic portion typically includes a residual amorphous phase as well as the crystalline phase; the residual amorphous phase may be termed a first amorphous phase. In embodiments, a maximum volume fraction of the crystalline phase in the glass ceramic portion is from 20% to 90%. In some aspects, the volume fraction of crystals in the glass ceramic portion decreases with increasing depth into the component, forming a gradient in the volume fraction of crystals. The glass portion of the component typically includes an amorphous phase, which may be termed a second amorphous phase. The glass portion of the component may also include a relatively small amount of a crystalline phase. In embodiments, a maximum volume fraction of the crystalline phase in the glass portion is less than 20%, less than 10% or less than 5%. In some embodiments, the crystals may have an average size of less than about 50 nm to provide transparency to visible radiation.

The glass component may be selectively heated using a variety of heat sources. For example, the exterior surface of the glass component may be heated using a heated mold, a heated plate, or other source of heat while the interior surface of the glass component is cooled using a cooled mold, cooled plate, or heat sink. As an additional example, the exterior surface of the glass component may be heated at least in part using a beam of radiation, such as a beam of light. For example, a laser may be used to heat the portion along the exterior surface to a sufficient temperature to nucleate and/or grow crystals in the glass. An adjacent portion of the glass component may be heated to a lesser extent. The beam may be a broad beam or a focused beam which can deliver energy to a narrower beam spot. The beam may be provided by a laser, such as a gas laser, a chemical laser, a solid state laser, a fiber laser, a photonic crystal laser, or a semiconductor laser. The beam of radiation may be used in conduction with one or more additional heat sources (e.g., a furnace).

In embodiments, crystallizing a surface region of a glass component to form a glass ceramic can create a compressive stress region along the surface of the component. Selective crystallization of a surface region of a glass component can create a glass ceramic portion having different properties than a remainder glass portion of the component. For example, if the crystals have a lower coefficient of thermal expansion than the glass from which they are formed, the glass ceramic portion of the component tends to contract less than the glass portion when cooled from a crystallization temperature. As a result, compressive stresses can form in the glass ceramic portion of the component.

Process 1400 may further include operation 1440 performing an ion exchange along the interior surface of the component, thereby forming an ion exchanged region in the glass portion along the interior surface. Operation 1440 may further include an operation of exchanging first alkali metal ions in a surface region of the glass portion with second alkali metal ions. The first alkali metal ions have a first size and the second alkali metal ions have a second size larger than the first size. The first alkali metal ions may be exchanged for the second alkali metal ions by immersing the component in a bath comprising the second alkali metal ions. For example, the exchange of ions may form an ion exchange layer which extends to an exchange depth less than a thickness of the glass portion of the component. In embodiments, lithium ions may be exchanged with sodium or potassium ions and/or sodium ions may be exchanged with potassium ions.

The bath for the ion exchange operation may comprise a solution of ionic salt. For example, a potassium nitrate bath may be used to introduce potassium ions into a glass or a glass ceramic and a sodium nitrate bath may be used to introduce sodium ions. The concentration of the ionic salt in the bath may be from about 30 to about 100 molar %. The temperature of the bath may be below a strain point or a glass transition point of a glass portion of the component, so that exchanging the first alkali metal ions in the component with the larger second alkali metal ions tends to cause an expansion of the ion-exchanged portion of the component. The bath temperature may be from the melting point of the ionic salt to approximately 600° C. As an example, the temperature of the bath may be from 350° C. to 450° C. The component may be immersed for four to six hours. As another example, an ion exchange to produce a relatively shallow compressive stress layer with a high surface compressive stress can use a bath with a concentration and/or a temperature which is relatively high. For example, to achieve a relatively shallow depth and relatively high surface concentration of potassium ions the ion exchange can be performed in 30 to 100 molar percent potassium nitrate for six to ten hours at 300° C. to 500° C.

Alternately, the first alkali metal ions may be exchanged for the second alkali metal ions by applying a paste comprising the second alkali metal ions to the component. Pastes that include high concentrations of potassium ions, for example, can be used in combination with heat to enhance or promote ion diffusion directly from the paste into the surface of the glass. The paste layer thickness is determined by the ion concentration required for diffusion into the glass surface. The component coated with the paste may then be heated, for a predetermined amount of time, to increase the diffusion of the ions into the component. For example, the coated component may be placed in an oven at a temperature from about 250° C. to about 500° C. In some embodiments, the oven can be under pressure, allowing for use of higher temperatures during the heating step (and thereby avoiding evaporated or boiled paste). In embodiments, the paste can include 30 to 100 molar percent or 75 to 100 molar percent of a sodium salt or a potassium salt such as sodium nitrate or potassium nitrate.

Expansion of the ion exchanged portion of the component may be constrained by other portions of the component which are not ion exchanged. As a result, a compressive stress region, such as a biaxial residual compressive stress region, may be created in the ion exchanged portion. In embodiments, the ion exchanged portion is in the form of an ion-exchanged layer.

In some embodiments, the exterior surface of the component may be masked or shielded in order to prevent or limit formation of an ion exchanged region in the glass ceramic portion of the component while forming the ion exchanged region in the glass portion. For example, the exterior surface of the component can be physically masked from the ions via a diffusion impermeable material, such as a metal or ceramic (e.g. silicon nitride), sealed over the region where diffusion is not wanted. This type of physical masking may essentially prevent ion-diffusion into that surface. The physical barrier would typically be removed from the component prior to use. Other types of masks, such as a polymer mask or a silicon dioxide mask, may also be used, but may provide more ion-permeable barriers.

Optionally, process 1400 includes operation 1460 of performing an ion exchange along an exterior surface of the component, thereby forming an ion exchanged region in the glass ceramic portion along the exterior surface. Operation 1460 may further include an operation of exchanging first alkali metal ions in a surface region of the glass ceramic portion with second alkali metal ions. Whether the ion exchange occurs in the crystals of the glass ceramic or the residual glass of the glass ceramic depends on the nature of the glass ceramic. In some embodiments, the exchange of ions may form an ion exchange layer which extends to an exchange depth less than a thickness of the glass ceramic portion of the component (as shown in FIG. 7B). In additional embodiments, the exchange of ions may form an ion exchange layer which extends to an exchange depth greater than a thickness of the glass portion of the component (as shown in FIG. 7C). The first alkali metal ions may be exchanged for the second alkali metal ions by immersing the component in a bath comprising the second alkali metal ions; the bath may be similar to that described for operation 1440. The ion exchanged region along the exterior surface may be formed at the same time as the ion exchanged region along the interior surface or may be formed in a separate ion exchange operation.

Figure 15:
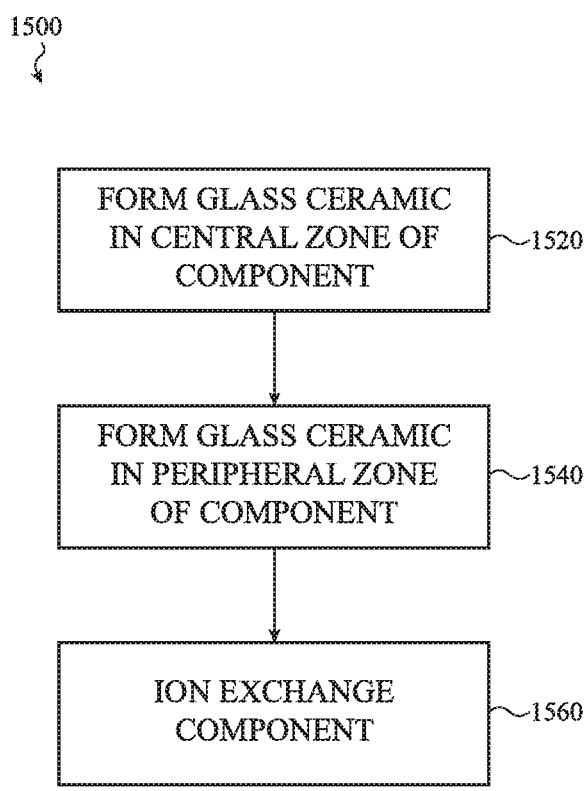
FIG. 15 shows a flowchart of a process for making a component according to an additional embodiment.

FIG. 15 shows a flowchart of a process for making a component according to an additional embodiment to produce a component having a different thickness of the glass ceramic in a peripheral zone than in a central zone of the component. Process 1500 further includes ion exchange of at least a glass portion of the component. For example, process 1500 may be used to form the glass ceramic portions shown in FIGS. 4C and 9C.

Process 1500 may include operation 1520 of forming a glass ceramic portion having a first thickness in a central zone of a glass component. For example, operation 1520 may comprise forming a glass ceramic along an exterior surface of a glass component in a similar fashion as described for operation 1420. The glass component is capable of crystallization to form the glass ceramic portion. For example, the glass may be an aluminosilicate glass capable of forming an aluminosilicate glass ceramic or a boroaluminosilicate glass capable of forming a boroaluminosilicate glass ceramic. As previously described, in some cases the glass ceramic may also be formed along an interior surface of the glass component.

Process 1500 may also include operation 1540 of forming a glass ceramic portion having a second thickness in a peripheral zone of the glass component. The second thickness may be greater than the first thickness. In some embodiments, a thickness of the glass ceramic portion in the peripheral zone may be substantially equal to a thickness of the component in the peripheral zone. The glass ceramic may be formed along an exterior surface of a glass component in a similar fashion as described for operation 1420. Operations 1520 and 1540 may occur sequentially or may overlap in time. For example, an initial layer of glass ceramic may be formed along the entire exterior surface of the glass component and then additional heating applied to form a greater thickness of the glass ceramic in the peripheral zone. As previously described, in some cases the glass ceramic may also be formed along an interior surface of the glass component.

Process 1500 may further include operation 1560 of forming an ion exchanged region along a surface of the component. In embodiments, operation 1560 includes an ion exchange along the interior surface of the component, thereby forming an ion exchanged region in the glass portion of the component along the interior surface. In additional embodiments, operation 1560 includes forming an ion exchanged region in the glass ceramic portion of the component along the exterior surface. The ion exchanged region may be formed in a similar fashion as described for operations 1440 and 1460. If desired, masking or application of an ion containing paste may be used to form ion exchanged regions having different depths along a surface, such as the interior or the exterior surface, of the component.

The above embodiments could be formed from a monolithic glass component or, alternatively, could be formed from a laminate or composite. For example, a laminate of two different glass layers may be formed by a variety of processes and then a glass ceramic formed in one of the layers. As another example, a layer of an at least partially crystallized glass ceramic may be bonded to a glass layer. Example laminate or composite components that include a crystalline ceramic bonded to a glass are shown in FIGS. 16A-17B.

In some embodiments, an enclosure component, such as a cover, includes a layer comprising a ceramic or glass ceramic which has been laminated to a layer comprising a glass. The layer comprising the ceramic or glass ceramic may define the exterior surface of the enclosure component while the layer comprising the glass may define an interior surface of the enclosure component. In embodiments, the glass is an ion exchangeable glass. Suitable ion exchangeable glasses include, but are not limited to, aluminosilicate glasses and aluminoborosilicate glasses.

In some embodiments, the enclosure component comprises a ceramic layer. As an example, the ceramic layer comprises a metal oxide. Suitable metal oxides include, but are not limited to, aluminum oxide (e.g., alumina, sapphire, $Al_2O_3$) and zirconium oxide (e.g., zirconia, yttria-stabilized zirconia, $ZrO_2$).

In additional embodiments, the enclosure component comprises a glass ceramic layer. The glass ceramic of the layer may have a chemical composition similar to that of the glass or may have a chemical composition different from that of the glass. In embodiments, the glass ceramic is ion exchangeable. Ion exchangeable glass ceramics include, but are not limited to, aluminosilicate glass ceramics and aluminoborosilicate glass ceramics.

The layers of the laminate may be directly bonded to each other so that an adhesive is not included between the layers. The strength of the bond between the layers of the laminate will depend, in part, on whether heat, pressure, or a combination thereof is applied to enhance bonding between the layers. As an example, a diffusion bonding process employing both heat and pressure may be used to bond the layer comprising the ceramic or glass ceramic to the layer comprising the glass. As an additional example, the temperature during the bonding process may be below a softening temperature or an annealing temperature of the glass. In some embodiments, the bond between the layers of the laminate is sufficiently strong that the parts may be co-finished to a final geometry.

Figure 16A:
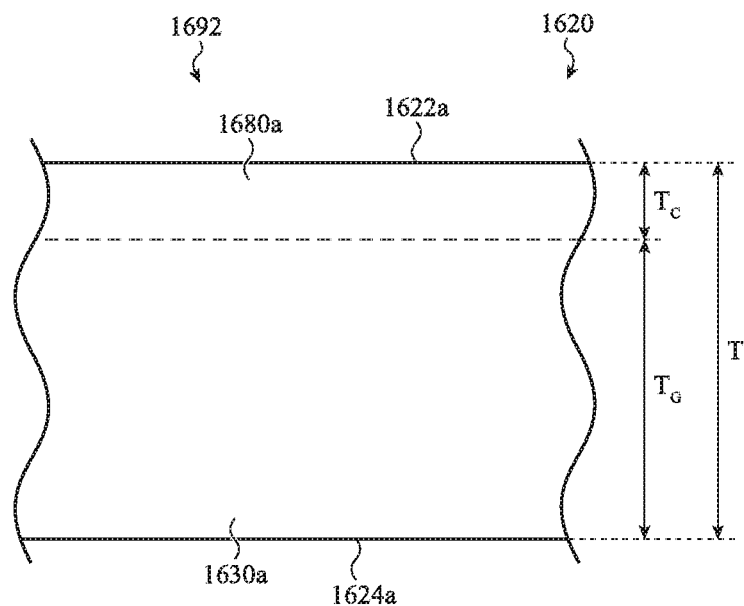
FIGS. 16A and 16B show simplified cross-section views of a laminate cover.
Figure 16B:
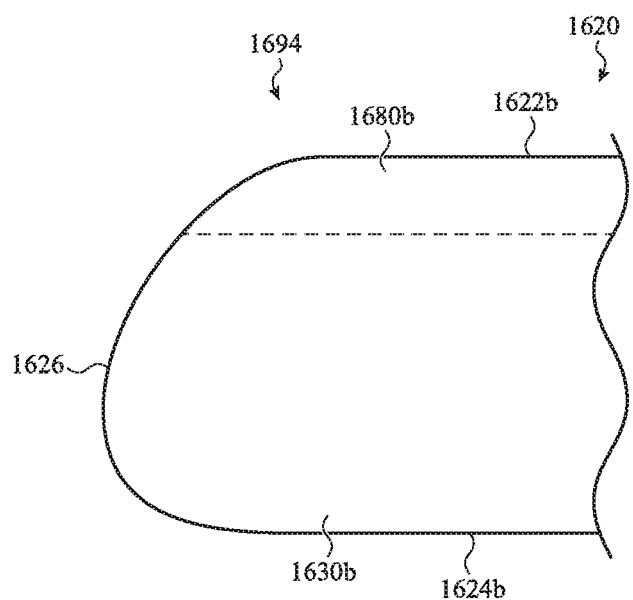

FIGS. 16A and 16B show simplified cross-section views of a laminate cover including a ceramic or glass ceramic layer (1680a, 1680b) at an exterior surface (1622a, 1622b) of the cover 1620. The cover further includes glass layer (1630a, 1630b) at an interior surface (1624a, 1624b) of the cover. As shown, the thickness T, of the ceramic or glass ceramic layer (1680a, 1680b) is substantially equal along the exterior surfaces 1622a and 1622b.

FIG. 16A shows a partial cross-section view of an example cover 1620 including a glass layer 1630a and a ceramic or glass ceramic layer 1680a in central zone 1692. The central zone 1692 further includes central exterior surface 1622a and central interior surface 1624a. The ceramic or glass ceramic portion 1680a defines central exterior surface 1622a and the glass portion 1630a defines central interior surface 1624a. As shown, each of central exterior surface 1622a and central interior surface 1624a are generally planar and opposite one another. The thickness T of the component, the thickness $T_C$ of the ceramic or glass ceramic portion, and the thickness $T_G$ of the glass portion in the central portion are also illustrated. The thickness of the ceramic or glass ceramic portion is shown as less than the thickness of the glass portion.

FIG. 16B shows a partial cross-section view of an example cover 1620 including a glass layer 1630b and a ceramic or glass ceramic layer 1680b in peripheral zone 1694. As shown, the ceramic or glass ceramic layer 1680b does not extend along the entire side surface 1626.

The peripheral zone 1694 further includes peripheral exterior surface 1622b, peripheral interior surface 1624b, and side surface 1626. The ceramic or glass ceramic layer 1680b defines peripheral exterior surface 1622b and a part of side surface 1626. Glass layer 1630b defines peripheral interior surface 1624b. As shown, side surface 1626 is curved rather than planar. Due to the curved shape of side surface 1626, the thickness of the ceramic or glass ceramic layer 1680b decreases as it approaches side surface 1626 (as measured from the plane defined by peripheral exterior surface 1622b). In additional embodiments, the exterior surface in the peripheral zone may comprise a curved region and a planar region.

Figure 17A:
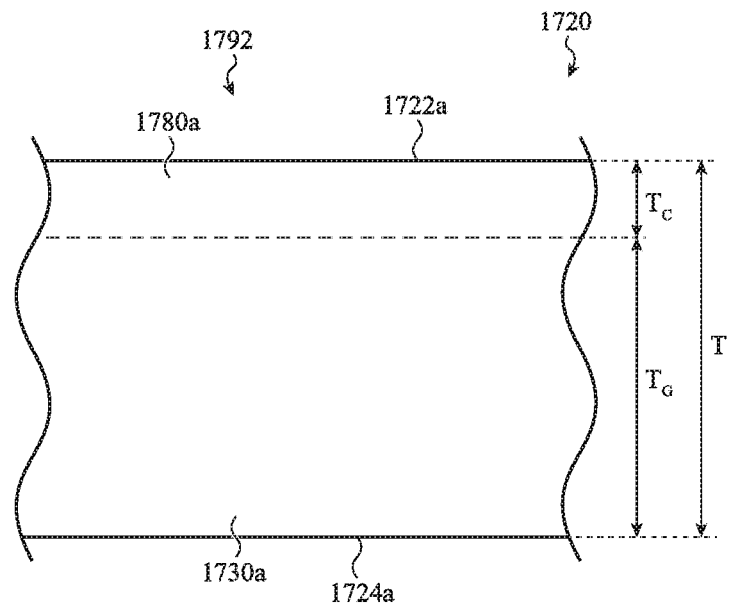
FIGS. 17A and 17B show simplified cross-section views of an additional laminate cover.
Figure 17B:
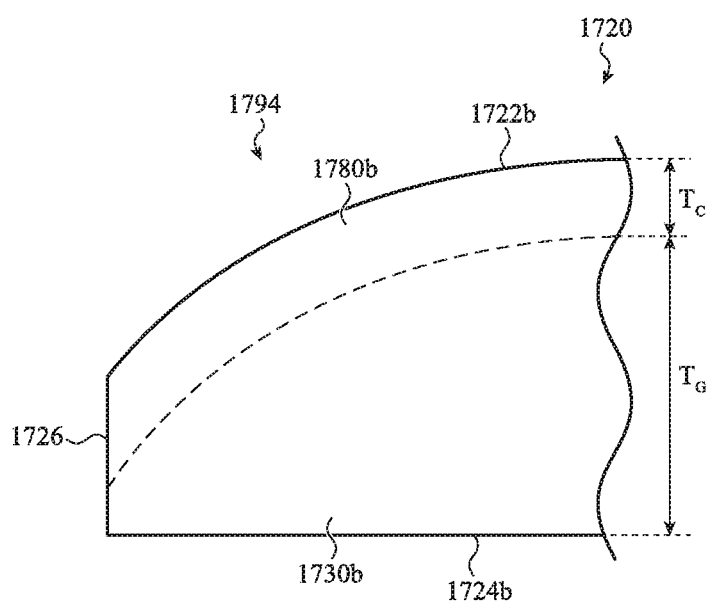

FIGS. 17A and 17B show simplified cross-section views of an additional laminate cover including a ceramic or glass ceramic layer (1780a, 1780b) at an exterior surface (1722a, 1722b) of the cover 1720. The cover further includes glass layer (1730a, 1730b) at an interior surface (1724a, 1724b) of the cover. As shown, the thickness of the ceramic or glass ceramic layer (1780a, 1780b) is substantially equal along the exterior surfaces 1722a and 1722b.

FIG. 17A shows a partial cross-section view of an example cover 1720 including a glass layer 1730a and a ceramic or glass ceramic layer 1780a in central zone 1792. The central zone 1792 further includes central exterior surface 1722a and central interior surface 1724a. The ceramic or glass ceramic portion 1780a defines central exterior surface 1722a and the glass portion 1730a defines central interior surface 1724a. As shown, each of central exterior surface 1722a and central interior surface 1724a are generally planar and opposite one another. The thickness T of the component, the thickness $T_C$ of the ceramic or glass ceramic portion, and the thickness $T_G$ of the glass portion in the central portion are also illustrated. As shown, the thickness of the ceramic or glass ceramic portion is less than the thickness of the glass portion.

FIG. 17B shows a partial cross-section view of an example cover 1720 including a glass layer 1730b and a ceramic or glass ceramic layer 1780b in peripheral zone 1794. As shown, the ceramic or glass ceramic layer 1780b does not extend along the entire side surface 1726, but extends along a more than half of side surface 1726. As shown, the glass layer 1730b varies in thickness so that peripheral exterior surface 1722b is curved rather than planar. Due to the variation in thickness of glass layer 1730b, the thickness of the component decreases as it approaches side surface 1726. In additional embodiments, the exterior surface in the peripheral zone may comprise a curved region and a planar region.

The peripheral zone 1794 includes peripheral exterior surface 1722b, peripheral interior surface 1724b, and side surface 1726. The ceramic or glass ceramic layer 1780b defines peripheral exterior surface 1722b and a part of side surface 1726. Glass layer 1730b defines peripheral interior surface 1724b.

Figure 18:
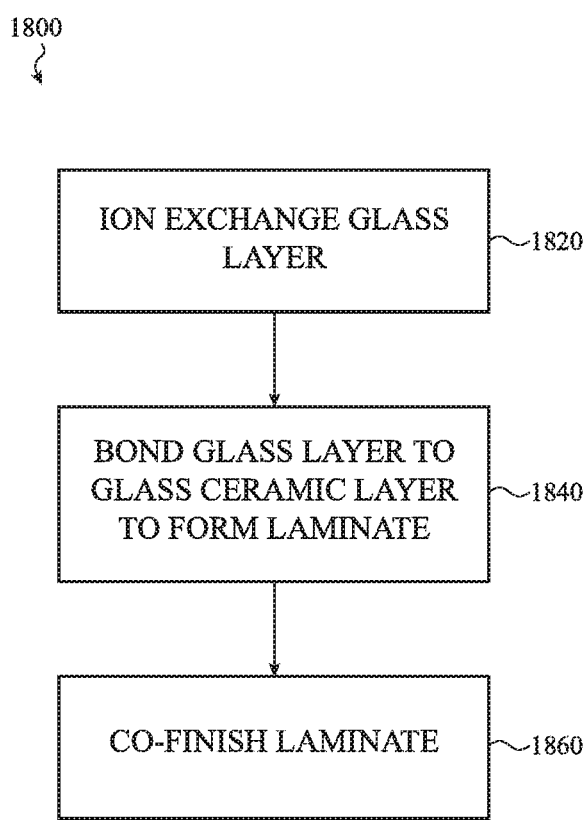
FIG. 18 shows a flowchart of a process for making a laminate component including a glass ceramic layer and a glass layer.

FIG. 18 shows a flowchart of a process 1800 for making a component including a glass ceramic layer and a glass layer. The glass ceramic may have a chemical composition similar to that of the glass or may have a chemical composition different from that of the glass.

Process 1800 may include operation 1820 of forming an ion exchanged region along a surface of the glass layer. In embodiments, an ion exchanged region is formed along the surface which will become the interior surface of the component, but little or no ion exchange occurs along the surface of the glass layer which is to be bonded to the glass ceramic layer. In further embodiments, a side surface of the glass layer may be ion exchanged. The ion exchanged region may be formed in a similar fashion as described for operations 1440 and 1460. If desired, masking or application of an ion containing paste may be used to form an ion exchanged region on one surface of the glass layer while producing little or no ion exchange along another surface of the glass layer.

Process 1800 may further include operation 1840 of bonding the glass layer to the glass ceramic layer to form the laminate. Generally, the glass layer is directly bonded to the glass ceramic layer without a separate adhesive layer between the glass layer and the glass ceramic layer. In embodiments, heat, pressure, or a combination of heat and pressure may be used to improve the bond strength. In additional embodiments, the surfaces of the glass and/or the glass ceramic are prepared by cleaning and/or conditioning. For example, the surface of the glass and/or the glass ceramic may be polished to reduce the roughness at the surface. In addition, the surface of the glass and/or the glass ceramic may be treated to create a hydrophilic or hydrophobic surface state. Heating of the laminate can convert interactions between the glass and the glass ceramic into covalent bonds. As an example, the laminate may be heated to a temperature between about 250° C. to about 400° C. In some embodiments, a compressive stress layer may be formed in the glass ceramic layer upon cooling from the bonding temperature due to differences in thermal expansion. However, the compressive stresses may be less than in process 1400 or 1500. Further, operation 1840 may precede or may follow operation 1820. Alternately, operation 1840 may include bonding using an adhesive (such as a pressure sensitive adhesive), an optical cladding layer, or other technique.

Process 1800 may further include operation 1860 of co-finishing the laminate. As previously discussed, the bonding of the glass layer to the glass ceramic layer is strong enough to allow co-finishing of the laminate without debonding the layers. In some embodiments, formation of covalent bonds between the glass layer and the glass ceramic layer allows the laminate to be co-finished.

Figure 19:
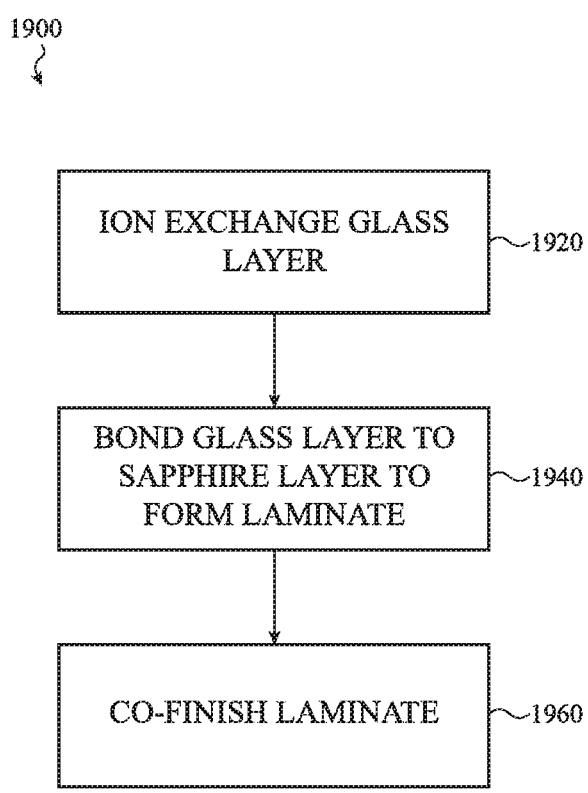
FIG. 19 shows a flowchart of a process for making a laminate component including a sapphire layer and a glass layer.

FIG. 19 shows a flowchart of a process 1900 for making a component including a sapphire layer and a glass layer. Process 1900 may further include operation 1920 of forming an ion exchanged region along a surface of glass layer. In embodiments, an ion exchanged region is formed along the surface which will become the interior surface of the component, but little or no ion exchange occurs along the surface of the glass layer which to be bonded to the sapphire layer. In further embodiments, a side surface of the glass layer may be ion exchanged. The ion exchanged region may be formed in a similar fashion as described for operations 1440 and 1460. If desired, masking or application of an ion containing paste may be used to form an ion exchanged region on one surface of the glass layer while producing little or no ion exchange along another surface of the glass layer.

Process 1900 may further include operation 1940 of bonding the glass layer to the sapphire layer to form the laminate. Generally, the glass layer is directly bonded to the sapphire layer without a separate adhesive layer between the glass layer and the sapphire layer. In embodiments, heat, pressure, or a combination of heat and pressure may be used to improve the bond strength. In additional embodiments, the surfaces of the glass and/or the sapphire are prepared by cleaning and/or conditioning. For example, the surface of the glass and/or sapphire may be polished to reduce the roughness at the surface. In addition, the surface of the glass and/or the sapphire may be treated to create a hydrophilic or hydrophobic surface state. Heating of the laminate can convert interactions between the glass and the sapphire into covalent bonds. As an example, the laminate may be heated to a temperature between about 250° C. to about 400° C. Operation 1940 may precede or may follow operation 1920.

Process 1900 may further include operation 1960 of co-finishing the laminate. As previously discussed, the bonding of the glass layer to the sapphire layer is strong enough to allow co-finishing of the laminate without debonding the layers. Due to the high hardness of sapphire as compared to some glass ceramics, a greater bond strength between the glass layer and the sapphire layer may be desired.

Figure 20:
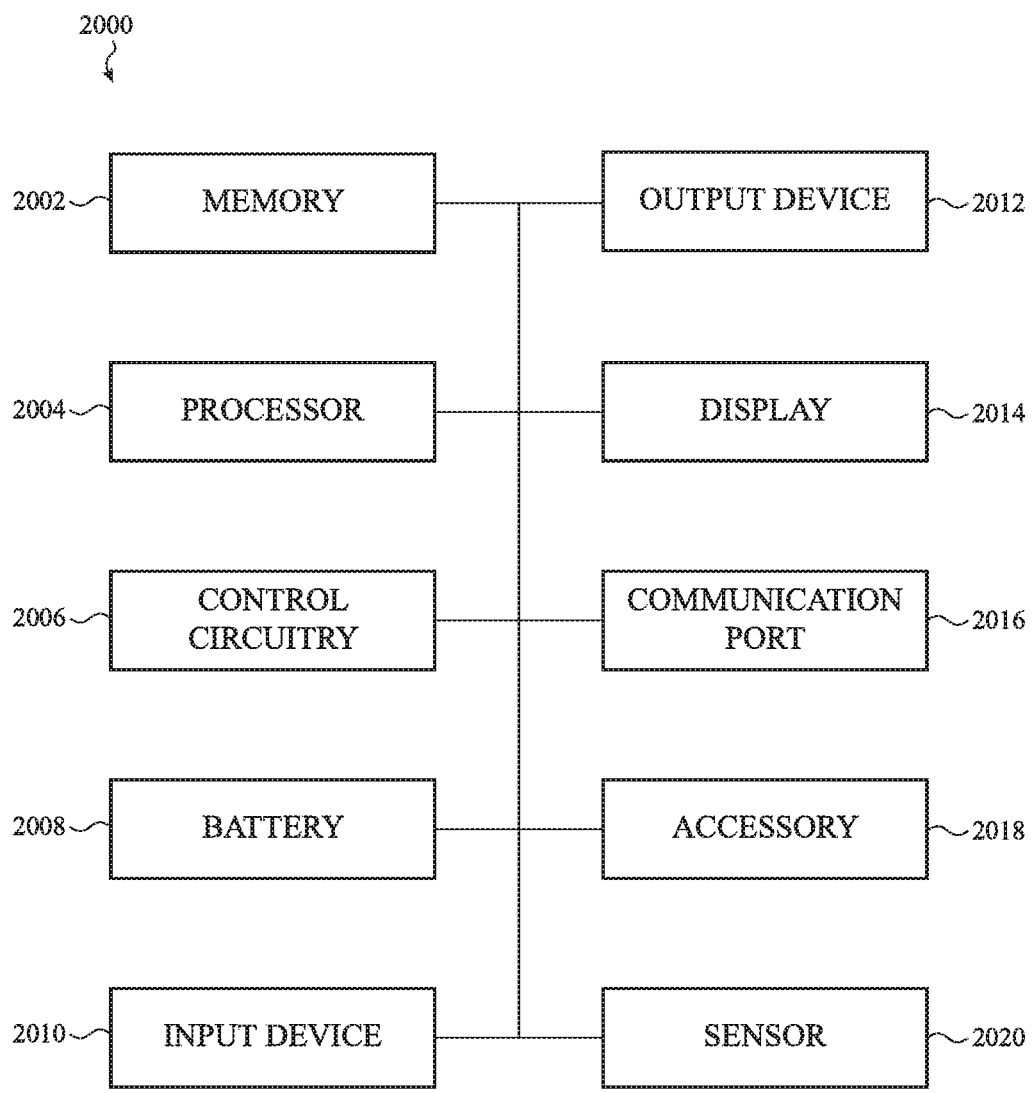
FIG. 20 shows a block diagram of components of an electronic device.

FIG. 20 shows a block diagram of components of an electronic device. The schematic representation depicted in FIG. 20 may correspond to components of the devices depicted in FIGS. 1A-19 as described above. However, FIG. 20 may also more generally represent other types of electronic devices with an enclosure component as described herein.

The electronic device 2000 includes a processor 2004 operably connected with a computer-readable memory 2002. The processor 2004 may be operatively connected to the memory 2002 component via an electronic bus or bridge. The processor 2004 may be implemented as one or more computer processors or microcontrollers configured to perform operations in response to computer-readable instructions. The processor 2004 may include a central processing unit (CPU) of the device 2000. Additionally and/or alternatively, the processor 2004 may include other electronic circuitry within the device 2000 including application specific integrated chips (ASIC) and other microcontroller devices. The processor 2004 may be configured to perform functionality described in the examples above.

The memory 2002 may include a variety of types of non-transitory computer-readable storage media, including, for example, read access memory (RAM), read-only memory (ROM), erasable programmable memory (e.g., EPROM and EEPROM), or flash memory. The memory 2002 is configured to store computer-readable instructions, sensor values, and other persistent software elements.

The electronic device 2000 may include control circuitry 2006. The control circuitry 2006 may be implemented in a single control unit and not necessarily as distinct electrical circuit elements. As used herein, "control unit" will be used synonymously with "control circuitry." The control circuitry 2006 may receive signals from the processor 2004 or from other elements of the electronic device 2000.

As shown in FIG. 20, the electronic device 2000 includes a battery 2008 that is configured to provide electrical power to the components of the electronic device 2000. The battery 2008 may include one or more power storage cells that are linked together to provide an internal supply of electrical power. The battery 2008 may be operatively coupled to power management circuitry that is configured to provide appropriate voltage and power levels for individual components or groups of components within the electronic device 2000. The battery 2008, via power management circuitry, may be configured to receive power from an external source, such as an alternating current power outlet. The battery 2008 may store received power so that the electronic device 2000 may operate without connection to an external power source for an extended period of time, which may range from several hours to several days.

In some embodiments, the electronic device 2000 includes one or more input devices 2010. The input device 2010 is a device that is configured to receive input from a user or the environment. The input device 2010 may include, for example, a push button, a touch-activated button, a touch screen (e.g., a touch-sensitive display or a force-sensitive display), capacitive touch button, dial, crown, or the like. In some embodiments, the input device 2010 may provide a dedicated or primary function, including, for example, a power button, volume buttons, home buttons, scroll wheels, and camera buttons.

In some embodiments, the electronic device 2000 includes one or more output devices 2012 configured to provide output to a user. The output device 2012 may include display 2014 that renders visual information generated by the processor 2004. The output device 2012 may also include one or more speakers to provide audio output.

The display 2014 may be capable of producing high-resolution graphical output. The display 2014 may be a liquid-crystal display (LCD), light-emitting diode, organic light-emitting diode (OLED) display, an active layer organic light emitting diode (AMOLED) display, organic electroluminescent (EL) display, electrophoretic ink display, or the like. If the display 2014 is a liquid-crystal display or an electrophoretic ink display, the display 2014 may also include a backlight component that can be controlled to provide variable levels of display brightness. If the display 2014 is an organic light-emitting diode or organic electroluminescent type display, the brightness of the display 2014 may be controlled by modifying the electrical signals that are provided to display elements. In addition, information regarding configuration and/or orientation of the electronic device may be used to control the output of the display as described with respect to input devices 2010.

The device 2000 may also include one or more sensors 2020, such as a force sensor, a capacitive sensor, an accelerometer, a barometer, a gyroscope, a proximity sensor, a light sensor, or the like. The sensors 2020 may be operably coupled to processing circuitry. In some embodiments, the sensor 2020 may be a touch sensor that is configured to detect or estimate a location of a touch along the exterior surface of the enclosure of the electronic device. For example, the touch sensor may be positioned below a cover or other enclosure component and comprise an array of capacitive electrodes. A touch sensor in combination with the display 2014 may define a touchscreen or touch-sensitive display.

In addition, the sensors 2020 may detect position and/or orientation of the electronic device and be operably coupled to processing circuitry. Example sensors 2020 for this purpose include accelerometers, gyroscopes, magnetometers, and other similar types of position/orientation sensing devices. In addition, the sensors 2020 may include a microphone, acoustic sensor, light sensor, optical facial recognition sensor, or other types of sensing device.

In embodiments, an electronic device 2000 may include sensors 2020 to provide information regarding configuration and/or orientation of the electronic device in order to control the output of the display. For example, a portion of the display 2014 may be turned off, disabled, or put in a low energy state when all or part of the viewable area of the display 2014 is blocked or substantially obscured. As another example, the display 2014 may be adapted to rotate the display of graphical output based on changes in orientation of the device 2000 (e.g., 90 degrees or 180 degrees) in response to the device 2000 being rotated.

The electronic device 2000 may also include a communication port 2016 that is configured to transmit and/or receive signals or electrical communication from an external or separate device. The communication port 2016 may be configured to couple to an external device via a cable, adaptor, or other type of electrical connector. In some embodiments, the communication port 2016 may be used to couple the electronic device to a host computer.

The electronic device 2000 may also include at least one accessory 2018, such as a camera, a flash for the camera, or other such device. The camera may be connected to other parts of the electronic device 2000 such as the control circuitry 2006.

The following discussion applies to the electronic devices described herein to the extent that these devices may be used to obtain personally identifiable information data. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. An electronic device comprising:
a display;
an enclosure component at least partially surrounding the display; and
a cover positioned over the display and comprising:
a central zone at least partially overlapping the display and comprising:
a first partially crystallized glass ceramic portion formed along an exterior surface of the cover and extending into the cover to a first thickness; and
a glass portion extending along an interior surface of the cover and including a compressive stress region; and
a peripheral zone contiguous with and at least partially surrounding the central zone and comprising a second partially crystallized glass ceramic portion formed along the exterior surface of the cover and extending into the cover to a second thickness greater than the first thickness.

2. The electronic device of claim 1, wherein:
the second thickness of the second partially crystallized glass ceramic portion is substantially equal to a thickness of the peripheral zone; and
the second partially crystallized glass ceramic portion further extends along at least a portion of the interior surface of the cover.

3. The electronic device of claim 1, wherein:
the compressive stress region is a first compressive stress region; and
the first partially crystallized glass ceramic portion further comprises a second compressive stress region.

4. The electronic device of claim 3, wherein the second partially crystallized glass ceramic portion further comprises a third compressive stress region.

5. The electronic device of claim 4, wherein:
the first partially crystallized glass ceramic portion comprises first exchanged ions within the second compressive stress region; and
the second partially crystallized glass ceramic portion comprises second exchanged ions within the third compressive stress region.

6. The electronic device of claim 1, wherein:
the glass portion is a first glass portion; and
the peripheral zone further comprises a second glass portion extending along the interior surface of the cover.

7. The electronic device of claim 1, wherein:
the first partially crystallized glass ceramic portion comprises a first volume percentage of a first crystalline phase;
the second partially crystallized glass ceramic portion comprises a second volume percentage of a second crystalline phase; and
the second volume percentage is greater than the first volume percentage.

8. A cover for an electronic device, comprising:
a central zone defining a window for viewing a display of the electronic device;
a glass ceramic portion along an exterior surface of the central zone, comprising an at least partially crystallized glass ceramic, and including a first compressive stress region extending a first depth into the cover;
a glass portion along an interior surface of the central zone, comprising a glass, and including a second compressive stress region extending a second depth into the cover; and
a tensile stress region between the first compressive stress region and the second compressive stress region.

9. The cover of claim 8, wherein:
the at least partially crystallized glass ceramic includes a crystalline phase and a first amorphous phase, the crystalline phase comprising from 20% to 90% of the glass ceramic portion by volume; and
the glass includes a second amorphous phase, the second amorphous phase comprising greater than 80% of the glass portion by volume.

10. The cover of claim 8, wherein a hardness and a crack resistance of the at least partially crystallized glass ceramic is greater than a hardness and a crack resistance of the glass.

11. The cover of claim 8, wherein:
the glass ceramic portion is a first glass ceramic portion;
the cover further comprises a peripheral zone at least partially surrounding the central zone and defining a curved region; and
the peripheral zone comprises a second glass ceramic portion along an exterior surface of the peripheral zone.

12. The cover of claim 8, wherein:
a first coefficient of thermal expansion of the at least partially crystallized glass ceramic is less than a second coefficient of thermal expansion of the glass; and the first compressive stress region is due, at least in part, to a difference between the first and the second coefficients of thermal expansion.

13. The cover of claim 8, wherein:
the at least partially crystallized glass ceramic comprises a group of exchanged ions; and
the first compressive stress region is due, at least in part, to a residual compressive stress caused by the group of exchanged ions.

14. The cover of claim 8, wherein a thickness of the glass ceramic portion is less than half a thickness of the cover along the central zone.

15. A cover for an electronic device, comprising:
a first layer defining at least a portion of an exterior surface of the cover and comprising a crystalline ceramic; and
a second layer bonded to the first layer, comprising a glass, and having a compressive stress region.

16. The cover of claim 15, wherein the second layer is diffusion bonded to the first layer.

17. The cover of claim 16, wherein:
the exterior surface includes a central exterior surface and a peripheral exterior surface at least partially surrounding the central exterior surface; and
the peripheral exterior surface comprises a curved region.

18. The cover of claim 17, wherein:
the cover defines an interior surface having a central interior surface and a peripheral interior surface at least partially surrounding the central interior surface;
the curved region of the peripheral exterior surface is a first curved region; and
the peripheral interior surface of the cover comprises a second curved region.

19. The cover of claim 15, wherein the crystalline ceramic comprises sapphire.

20. The cover of claim 15, wherein:
the crystalline ceramic comprises an at least partially crystallized glass ceramic; and
a chemical composition of the at least partially crystallized glass ceramic is different than a chemical composition of the glass.

* * * * *